(12) United States Patent
Ballandras et al.

(10) Patent No.: US 12,085,460 B2
(45) Date of Patent: *Sep. 10, 2024

(54) RESONATOR DEVICE FOR MEASURING STRESS INCLUDING AT LEAST TWO RESONATORS WITH SHARED CAVITY

(71) Applicant: Soitec, Bernin (FR)

(72) Inventors: Sylvain Ballandras, Besançon (FR); Emilie Courjon, Besançon (FR); Florent Bernard, Besançon (FR); Alexandre Raveski, Besançon (FR)

(73) Assignee: SOITEC, Bernin (FR)

( * ) Notice: Subject to any disclaimer, the term of this patent is extended or adjusted under 35 U.S.C. 154(b) by 281 days.

This patent is subject to a terminal disclaimer.

(21) Appl. No.: 17/599,896

(22) PCT Filed: Mar. 19, 2020

(86) PCT No.: PCT/EP2020/057616
§ 371 (c)(1),
(2) Date: Sep. 29, 2021

(87) PCT Pub. No.: WO2020/200810
PCT Pub. Date: Oct. 8, 2020

(65) Prior Publication Data
US 2022/0196490 A1 Jun. 23, 2022

(30) Foreign Application Priority Data
Mar. 29, 2019 (FR) ...................................... 1903408

(51) Int. Cl.
*G01L 1/16* (2006.01)
(52) U.S. Cl.
CPC .................................. *G01L 1/165* (2013.01)

(58) Field of Classification Search
CPC . G01L 1/165; G01L 3/106; G01L 3/10; G01L 9/0025; G01L 9/008; G01L 1/26
See application file for complete search history.

(56) References Cited

U.S. PATENT DOCUMENTS

| 2007/0028700 A1 | 2/2007 | Liu et al. |
| 2009/0314104 A1 | 12/2009 | Lohr et al. |

(Continued)

FOREIGN PATENT DOCUMENTS

| DE | 10054198 A1 | 9/2001 | |
| DE | 112020003512 T5 * | 4/2022 | ........... H01L 41/312 |

(Continued)

OTHER PUBLICATIONS

Baldauf W., Frequenzanaloge Drehmomentmessung mit Oberflächenwellen-Resonatoren, TM Technisches Messen, vol. 58, No. 9, (1991), pp. 329-334.

(Continued)

*Primary Examiner* — Andre J Allen
(74) *Attorney, Agent, or Firm* — TraskBritt

(57) ABSTRACT

A resonator device for measuring stress comprises at least two resonators, each resonator comprising an inter-digitated transducer structure arranged between two reflecting structures on or in a piezoelectric substrate, characterized in that the at least two resonators are arranged and positioned such that they have two different wave propagation directions, and each resonator comprises at least two parts with the area between the two parts of the at least two resonators forming a cavity, wherein the cavity is shared by the at least two resonators. A differential sensing device may comprise at least one resonator device as described wherein.

20 Claims, 19 Drawing Sheets

(56) References Cited

U.S. PATENT DOCUMENTS

| | | | | |
|---|---|---|---|---|
| 2010/0289380 | A1* | 11/2010 | Ballandras | H03H 9/02637 |
| | | | | 310/313 D |
| 2017/0052174 | A1* | 2/2017 | Branch | B01L 3/502715 |
| 2023/0179170 | A1* | 6/2023 | Park | H03H 3/02 |
| | | | | 310/344 |
| 2023/0366755 | A1* | 11/2023 | Courjon | G01L 1/162 |

FOREIGN PATENT DOCUMENTS

| | | | | |
|---|---|---|---|---|
| WO | 2003/034013 A1 | 4/2003 | | |
| WO | WO-2018140011 A1 * | 8/2018 | | B01L 3/502715 |
| WO | WO-2022184815 A1 * | 9/2022 | | G01K 11/265 |
| WO | WO-2022184833 A1 * | 9/2022 | | |

OTHER PUBLICATIONS

French Preliminary Search Report and Opinion for French Application No. 1903408 dated Nov. 22, 2019, 8 pages.
International Search Report for International Application No. PCT/EP2020/057616 dated May 29, 2020, 4 pages.
International Written Opinion for International Application No. PCT/EP2020/057616 dated May 29, 2020, 5 pages.

* cited by examiner

RESONATOR DEVICE FOR MEASURING STRESS INCLUDING AT LEAST TWO RESONATORS WITH SHARED CAVITY

CROSS-REFERENCE TO RELATED APPLICATIONS

This application is a national phase entry under 35 U.S.C. § 371 of International Patent Application PCT/EP2020/057616, filed Mar. 19, 2020, designating the United States of America and published as International Patent Publication WO 2020/200810 A1 on Oct. 8, 2020, which claims the benefit under Article 8 of the Patent Cooperation Treaty to French Patent Application Serial No. FR1903408, filed Mar. 29, 2019.

TECHNICAL FIELD

The present disclosure relates to an acoustic wave device for sensor applications, and more particularly to acoustic wave differential sensors.

BACKGROUND

Sensors are of growing importance and become increasingly ubiquitous in every-day life. Microelectromechanical systems (MEMS) are an attractive option to answer the demand for increased performance of sensors along with decreased sizes and costs. Surface acoustic wave (SAW) sensors, and to a lower extent bulk acoustic wave (BAW) sensors or Lamb wave or Love wave or shear-plate mode acoustic sensors, offer particularly advantageous options due to a wide variety of measurable ambient parameters including temperature, pressure, strain and torque, for example.

Acoustic wave sensors utilize the piezoelectric effect to transduce an electrical signal into a mechanical/acoustic wave. SAW-based sensors are built on single-crystal piezoelectric materials like quartz ($SiO_2$), lithium niobate ($LiNbO_3$), lithium tantalate ($LiTaO_3$), langasite (LGS) and aluminum nitride (AlN) or zinc oxide (ZnO) deposited on silicon. An inter-digitated transducer (IDT) converts the electrical energy of an incident electrical signal into acoustic wave energy. The acoustic wave travels across the surface (or bulk) of a device substrate via the so-called delay line to another IDT that converts the acoustic wave back to an electrical signal that can be detected. In some devices, mechanical absorbers and/or reflectors are provided in order to prevent interference patterns and reduce insertion loss. In some devices, the other (output) IDT is replaced by a reflector that reflects the generated acoustic wave back to the (input) IDT that can be coupled to an antenna for remote interrogation of the sensor device.

A particular class of acoustic sensors comprises resonators exhibiting resonator frequencies that vary according to varying ambient conditions. A conventional surface wave resonator, for example, comprises an electroacoustic transducer with inter-digitated combs arranged between Bragg mirrors. At the resonance frequency, the condition of synchronism between the reflectors is satisfied making it possible to obtain a coherent addition of the different reflections, which occur under the reflectors. A maximum of acoustic energy is then observed within the resonant cavity and, from an electrical point of view, a maximum of amplitude of the current admitted by the transducer is observed.

Differential acoustic wave sensors comprise two or more resonators exhibiting different resonance frequencies wherein differences in the measured frequencies reflect variations in the parameter to be measured as, for example, strain.

The differential sensor must be able to segregate the origin of the perturbation and to reduce or suppress contributions from other parameters, such as contributions from vibrations or temperature fluctuations. This requires the development of a differential sensor for which temperature and vibration sensitivity must be as small as possible or rigorously equal from one resonator to another to allow for rejection by signal subtraction.

FIG. 1 shows such a surface acoustic wave differential sensor according to the state of the art. This sensor is configured to measure stress, e.g., on a rotating object. The surface acoustic wave differential sensor 100 comprises two surface acoustic wave resonators 102, 104 provided on a piezoelectric substrate 106. Each surface acoustic wave resonator 102, 104 comprises an inter-digitated transducer structure 108, 110 and a pair of reflecting structures 112, 114, 116, 118. The reflecting structures 112, 114 are arranged on each side of the inter-digitated transducer structure 108 and the reflecting structures 116 and 118 on each side of the interdigitated transducer structure 110, in both cases with respect to the direction of propagation of the acoustic wave, see arrows 120, 122, of the corresponding transducer structure 108, 110. The two resonators 102 and 104 are electrically connected to each other in a differential way by two conductive lines 124 and 126.

Both resonators 102, 104 are positioned on the piezoelectric substrate 106 with an angle Y of ±45° in regards with the crystallographic axis X of a singly rotated Quartz substrate 106, corresponding to the usual propagation direction of a Rayleigh wave. Thus, the two resonators are perpendicular to each other.

Each resonator 102, 104 exhibits a resonance peak at a frequency f1, f2, respectively.

The resonators 102, 104 are connected in parallel and then connected to an antenna to be wirelessly interrogated, the differential measure resulting for the difference of the resonance frequencies measured either simultaneously or sequentially.

By aligning one resonator 102, 104 in parallel with the radial direction of a rotating object, the differential sensor 100 is sensitive to radial stress occurring on the object. On the occurrence of radial stress, deformations occur in the sensor leading to extension in the one resonator and contraction in the other. This leads to changes with opposite signs and typically the same absolute value, in the resonant frequencies. Thus, the difference in the resonant frequencies changes by the sum of the two absolute values. By measuring the variation of the difference Δf between the two resonant frequencies, one can determine the applied force, as the difference Δf is linearly proportional to the torque M. Unwanted temperature variation effects, do, however, cancel out, as they will affect both resonators in the same way.

However, in the differential sensor 100 according to the state of the art, the stress state is not measured at the same location by the two resonators 102, 104, nor the temperature. Consequently, the measurement might be negatively affected by inhomogeneities in the material of the object, leading to errors in the stress determination.

The object of the present disclosure is therefore to overcome the drawback cited above resulting in an improved sensing device.

BRIEF SUMMARY

The object of the present disclosure is achieved by a resonator device comprising at least two resonators, each resonator comprising an inter-digitated transducer structure arranged between two reflecting structures on or in a piezoelectric substrate, characterized in that the at least two resonators are arranged and positioned such that they have two different wave propagation directions, and each resonator comprises at least two parts with the area between the two parts of the at least two resonators forming a cavity, wherein the cavity is shared by the at least two resonators. Thus, the two resonators of the device measure at the same location and the measurement is therefore less influenced by inhomogeneities in the material on which the resonators are attached. This is contrary to the state-of-the-art device, where each resonator measures at a different location.

According to a variant of the present disclosure, each of the at least two parts of the at least two resonators can comprise at least one reflecting structure and a part of the inter-digitated transducer structure of the corresponding resonator. The device as described enables management of parasites due to directivity effects.

According to a variant of the present disclosure, the inter-digitated transducer structure of the resonator can comprise inter-digitated comb electrodes, and wherein for at least one transducer structure of the at least two resonators, the inter-digitated comb electrodes are defined by the Bragg condition given by $p=\lambda/2$, $\lambda$ being the operating acoustic wavelength of the transducer structure and p being the electrode pitch of the transducer structure. The device as described enables management of parasites due to directivity effects.

According to a variant, the two different wave propagation directions of the at least two resonators can form an angle $\Theta$ with each other, $\Theta$ being equal to +90° or smaller.

According to a variant of the present disclosure, the electrodes of the inter-digitated transducer structure of the one resonator can be electrically connected with the electrodes of the transducer structure of the other resonator in a differential way. The connection between the electrodes of the at least two resonators can be either in parallel, or in series, depending on their operating conditions. Thus, the device according to the present disclosure can operate either on resonance or anti-resonance, depending on the design choices, in contrast to the state-of-the-art device.

According to a variant of the present disclosure, at least one of the resonators can be arranged and positioned such that its wave propagation direction is parallel to one of the crystalline axis of the piezoelectric substrate.

According to a variant of the present disclosure, at least one of the resonators can be arranged and positioned such that its wave propagation direction makes an angle $\Psi$ to one of the crystalline axis of the piezoelectric substrate, in particular, an angle $\Psi$ equal to ±45°.

According to a variant of the present disclosure, at least a part of the surface of the cavity can be metalized. The device as described enables filtering or selection of the possible modes of the structure, and even allows for operating in a coupled mode configuration.

According to a variant of the present disclosure, the metallization of the cavity can comprise at least one or more grating. When more than one grating is present, the gratings are superimposed to each other. The device as described enables filtering or selection of the possible modes of the structure, and even allows for operating in a coupled mode configuration.

According to a variant of the present disclosure, each one of the reflecting structures of the resonators can comprise one or more metallic strips, the metallic strips being connected to each other or connected to ground. Thus, the resonators can also be tag devices. Furthermore, the connection of the metallic strips to each other or to ground results in an improvement of the reflection coefficient of the reflecting structures at the Bragg condition. At the Bragg condition, the reflected waves due to electrical and mechanical loading are in phase so that an improved reflection coefficient of the reflector at the Bragg condition results in a better detection of the reflected waves by the corresponding transducer structure.

According to a variant of the present disclosure, the resonator can be a surface acoustic wave resonator (SAW), a bulk acoustic wave resonator (BAW), a Lamb wave, a Love wave or shear-plate mode acoustic resonator.

The object of the present disclosure is also achieved by a differential sensing device, which may comprise at least one resonator device as described previously. The differential sensing device enables measurement of both the radial and tangential forces in a differential manner, namely the sensor system enables measurement of the stress by segregating the origin of the perturbation and immunity to other stimuli such as temperature, vibrations or pressure.

According to a variant of the present disclosure, the propagation direction of one of the resonators can be parallel or perpendicular to a radial direction to sense a radial force. The resonator enables measurement of the radial forces in a differential manner, namely the sensing device enables measurement of the stress by segregating the origin of the perturbation and immunity to other stimuli such as temperature, vibrations, or pressure.

According to a variant of the present disclosure, the propagation direction of one of the resonators is at an angle $\Psi$, in particular, at 45° with respect to a radial direction to sense a tangential force. The resonator enables measurement of the tangential forces in a differential manner, namely the sensing device enables measurement of the stress by segregating the origin of the perturbation and immunity to other stimuli such as temperature, vibrations, or pressure.

According to a variant of the present disclosure, one resonator device can be arranged so that that its wave propagation direction is parallel to one of the crystalline axis of the piezoelectric substrate and one resonator device can be arranged so that its wave propagation direction makes an angle $\Psi$ to one of the crystalline axis of the piezoelectric substrate, in particular, an angle $\Psi$ equal to ±45°. The differential sensing device enables measurement of both the radial and tangential forces in a differential manner, namely the sensing device enables measurement of the stress by segregating the origin of the perturbation and immunity to other stimuli such as temperature, vibrations, or pressure.

According to a variant of the present disclosure, the differential sensing device can further comprise an antenna connected to the at least one resonator device.

According to a variant of the present disclosure, at least two differential resonator devices can be provided on the same piezoelectric substrate. Therefore, the fabrication process will be simpler and faster compared to the state-of-the-art device for which each differential sensor is fabricated on a separate substrate, as both differential sensors share the same structural characteristics and dimensions.

BRIEF DESCRIPTION OF THE DRAWINGS

The present disclosure may be understood by reference to the following description taken in conjunction with the accompanying figures, in which reference numerals identify features of the present disclosure.

DETAILED DESCRIPTION

The present disclosure will now be described in more detail using advantageous embodiments in an exemplary manner and with reference to the drawings. The described embodiments are merely possible configurations and it should be kept in mind that the individual characteristics as described above can be provided independently of one another or can be omitted altogether during the implementation of embodiments of the present disclosure.

Figure 2A:
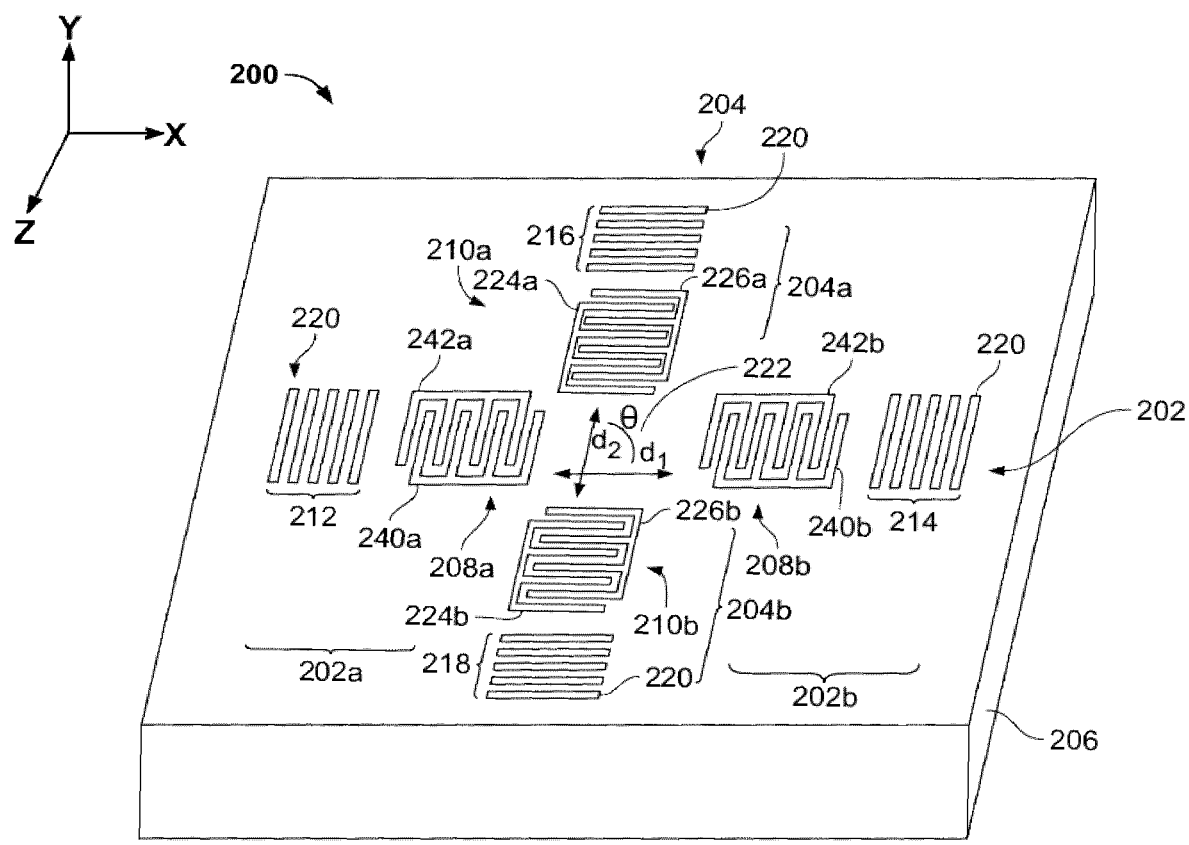
FIG. 2A shows a resonator device according to a first embodiment of the present disclosure.

FIG. 2A shows a resonator device according to a first embodiment of the present disclosure. In the following, the resonator device will be described as a surface acoustic wave resonator device (SAW). According to variants, bulk acoustic wave (BAW) resonators, Lamb wave or Love wave or shear-plate mode resonators could be used in the same way according to the present disclosure.

In FIG. 2A, the surface acoustic wave sensor 200 comprises two surface acoustic wave resonators 202, 204 provided over or in a surface acoustic wave propagating substrate 206. Each surface acoustic wave resonator 202, 204 comprises an inter-digitated transducer structure 208a, 208b and 210a, 210b, each sandwiched by a couple of reflecting structures 212, 214 and 216, 218. The reflecting structures 212, 214, 216, 218 comprise a reflector with one or more metallic strips 220, and are configured to reflect the surface acoustic wave generated by the inter-digitated transducer structures.

Here, the reflecting structures 212, 214, 216, 218 are arranged with a gap from the inter-digitated transducer structures 208a, 208b, 210a, 210b. In a variant of the present disclosure, no gap can be present between the reflecting structures and the transducer structure, so that the reflecting structure can be considered as continuing the inter-digitated transducer periodic structure in a synchronous, i.e., with the same period and same metallization ratio, or in a non-synchronous way.

In another variant, the at least one of the reflecting structures 212, 214, 216, 218 comprises more than one reflector, wherein the reflectors can have the same number of metallic strips 220 or not.

In a variant of the present disclosure, the metallic strips 220 of the reflecting structures 212, 214, 216, 218 can be connected to each other and/or shortened. This can result in an improvement of the reflection coefficient of the reflecting structures at the Bragg condition compared to electrically isolated reflecting structures. At the Bragg condition, the reflected waves due to electrical and mechanical loading are in phase so that an improved reflection coefficient of the reflector at the Bragg condition results in a better detection of the reflected waves by the corresponding transducer structure.

The transducer structures 208a, 208b, and the transducer structures 210a, 210b each comprise two inter-digitated comb electrodes 224a, 226a, 224b, 224b and 240a, 242a, 240b, 242b. The comb electrodes 224a, 226a, 224b, 224b and 240a, 242a, 240b, 242b are formed of any suitable conductive metal, for example, Aluminum or Aluminum alloy. Nevertheless, other material may be used that generates stronger reflection coefficient for smaller electrode relative thickness. In that matter, the preferred electrode materials are Copper (Cu), Molybdenum (Mo), Nickel (Ni), Platinum (Pt) or Gold (Au) with an adhesion layer such as Titanium (Ti) or Tantalum (Ta) or Chromium (Cr), Zirconium (Zr), Palladium (Pd), Iridium (Ir), Tungsten (W), etc. In FIG. 2A, the electrodes comprise fingers. In a variant of the embodiment, they could also have spilt fingers comprising each two or more directly adjacent electrode fingers belonging to the same comb electrode. In another variant, the electrode fingers can be slanted enabling a beam-steering compensation.

The transducer structures 208a, 208b and 210a, 210b are also defined by the electrode pitch p (not shown), corresponding to the edge-to-edge distance between two neighboring electrode fingers from opposite comb electrodes 224a, b and 226a, b and 240a,b and 242a,b. In a variant of the present disclosure, the electrode pitch p is defined by the Bragg condition given by $p=\lambda/2$, $\lambda$ being the operating acoustic wavelength of the transducer structures 212, 214. By operating acoustic wavelength $\lambda$, one understands $\lambda$ being the acoustic wavelength following $\lambda=V/f$ with f the predetermined central frequency of the resonator structure and V the phase velocity of the utilized mode. Such transducer structure, as shown in FIG. 2A, is also said to be a 2-finger-per-wavelength inter-digitated transducer (IDT).

In a variant of the present disclosure, the inter-digitated transducer structure 208, 210 can operate out of the Bragg conditions, for instance, using a 3- or 4-finger-per-wavelength excitation structure or 5-finger-per-two-wavelength transducers or 7- or 8-finger-per-three-wavelength transducers.

The transducer structures 208a, 208b and 210a, 210b can be symmetrical, namely they have the same number of electrode fingers with the same characteristics. However, in a variant of the present disclosure, they can also be different, in particular, they can have a different number of electrode fingers and/or a different pitch p.

In a variant of the present disclosure, the inter-digitated transducer structures 208a, 208b and 210a, 210b can be tapered to reduce transverse modes.

Figure 1:
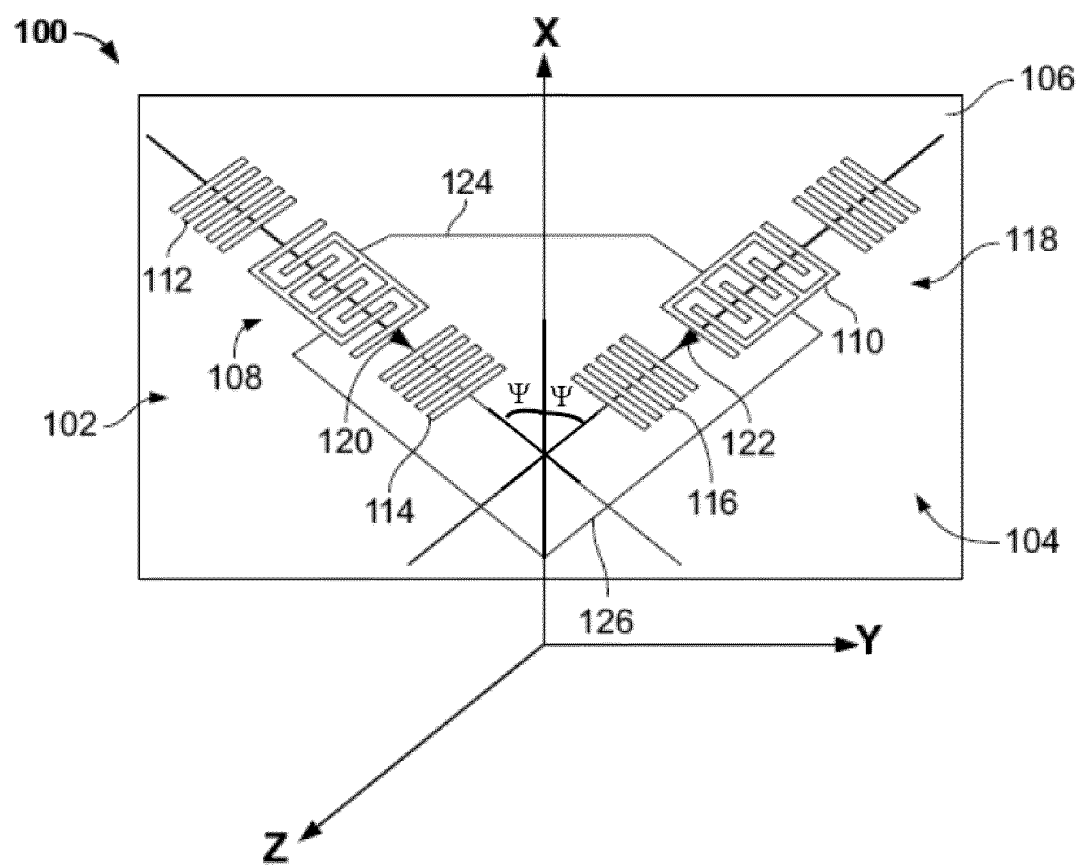
FIG. 1 shows a resonator device according to the state of the art.

The substrate 206 over or in which the resonators 202, 204 are provided is a piezoelectric bulk material, with crystallographic axis X, Y and Z as shown in FIG. 1. The piezoelectric substrate 206 herein described by way of example may be Quartz, in particular, AT-cut Quartz.

According to a variant of the present disclosure, the acoustic wave propagating substrate 206 on which the resonators 202, 204 and hence the transducer structures 208a, 208b and 210a, 210b and the reflecting structures 212, 214, 216, 218 are provided can be a composite substrate 206. The composite substrate 206 comprises a layer of piezoelectric material of a certain thickness, formed on top of a base substrate. The piezoelectric layer by way of example may be Lithium Tantalate (LiTaO3) or Lithium Niobate (LiNbO3).

According to the present disclosure, the resonators 202, 204 are positioned on the substrate 206 so that they have two different surface acoustic wave propagation directions but due to cross like arrangement of the two resonators 202, 204, they are sharing at least partially the same area on the substrate 206.

In this embodiment, the first resonator 202 is positioned so that its direction of propagation of acoustic wave is in the crystallographic direction X of the acoustic wave propagating substrate 206. In FIG. 2A, the direction of propagation of the acoustic wave of the second resonator 204 is in the crystallographic direction Z of the piezoelectric substrate 206. Thus, the propagation direction of the acoustic wave for the resonator 204 is rotated by an angle $\Theta=90°$ compared to the crystallographic direction X of the acoustic wave propagating substrate 206 and compared to the surface acoustic wave propagation direction of the first resonator 202. In FIG. 2A, the angle $\Theta$ has a value of 90°, but in a variant of the embodiment, the angle could be different. In a variant, the angle $\Theta$ can be lower than 90°, for example, with a variation of ±10°, which enables correction of effects such as beam steering. In these variants, however, the symmetry with the crystallographic axis X still remains in order to keep equal properties along the two propagation directions.

In this embodiment, besides their wave propagation direction, the resonators 202, 204 have the same geometrical structure, meaning that their transducer structure 208a, 208b and 210a, 210b, respectively, and the reflecting structures 212, 214, 216, 218 have the same designs and/or dimensions. In a variant of the embodiment, they can have a different design, e.g., different dimensions and/or different geometry. For example, the reflecting structures 212, 214, 216, 218 can be different but the transducer structures 208a, 208b and 210a, 210b are the same or vice-versa or both the reflecting structures 212, 214, 216, 218 and the transducer structures 208a, 208b and 210a, 210b can be different.

In this embodiment, the resonators 202, 204 are split into two parts, each part of a resonator being separated from the other part by a certain distance d1, d2, respectively.

The cavity 222 located in between the split parts 202a, 202b and 204a, 204b of the two resonators 202, 204, with its dimensions defined by the distances d1 and d2, corresponds to an acoustic cavity 222, in particular, a resonant acoustic cavity 222. In FIG. 2A, the distances d1 and d2 are identical, but in a variant of the embodiment, they can be different.

In this embodiment, the two split parts 202a, 202b of the resonator 202 are symmetrical in regard to the cavity 222 and identical to each other so that the cavity 222 is actually located in the center part of the resonator 202. In a variant of the embodiment, the two split parts 202a, 202b of the resonator 202 are not identical and/or symmetric in regards of the cavity 222.

In this embodiment, furthermore, the two split parts 204a, 204b of the resonator 204 are also symmetric in regard to the cavity 222 and identical to each other so that the cavity 222 is actually located in the center part of the resonator 204. Thus, in FIG. 2A, the cavity 222 is a central cavity common to both resonators 202, 204.

In this embodiment, furthermore, the split parts 202a, 202b and 204a, 204b of both resonators 202, 204 are symmetric in regard to the cavity 222 and identical. In a variant of the embodiment, the split parts 202a, 202b and 204a, 204b of the resonators 202, 204 are not identical and/or symmetric in regards of the cavity 222.

The resonators 202, 204 are split in a manner so that, actually, the transducer structure of the resonator is split into two parts 208a and 208b and 210a and 210b. Thus, each split part 202a, 202b, 204a, 204b of the resonators 202, 204 actually comprises a reflecting structure and a split part of the transducer structure of the respective resonator. Hence, the split part 202a of the resonator 202 comprises the reflecting structure 212 and the split part 208a of the transducer structure. The split part 202b of the resonator 202 comprises the reflecting structure 214 and the split part 208b of the transducer structure. The split part 204a of the resonator 204 comprises the reflecting structure 216 and the split part 210a of the transducer structure. The split part 204b of the resonator 204 comprises the reflecting structure 218 and the split part 210b of the transducer structure.

In a variant of the embodiment, the resonator is split in between one reflecting structure and the transducer structure. Thus, one split part of the two split parts of the resonator comprises the entire transducer structure with one reflecting structure and the other part the other reflecting structure.

Figure 2B:
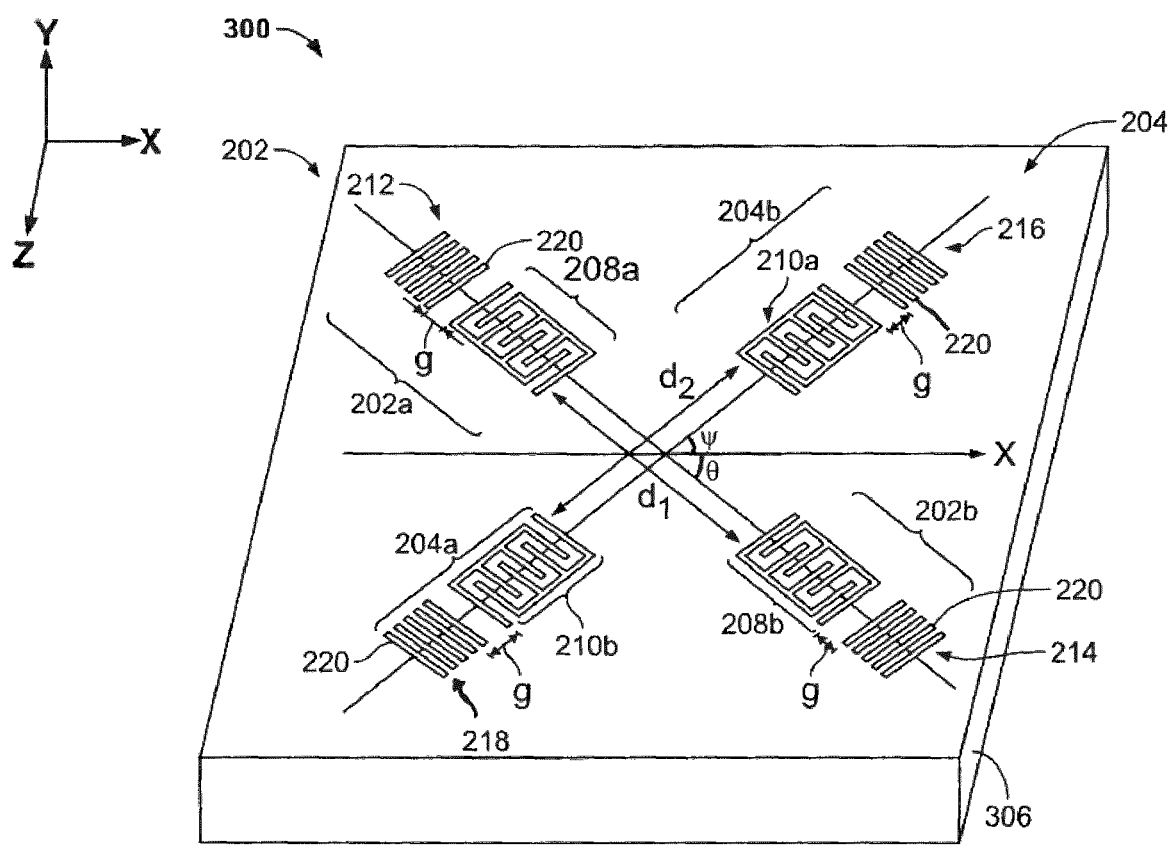
FIG. 2B shows a resonator device according to a second embodiment of the present disclosure.

FIG. 2B shows a surface acoustic wave device according to a second embodiment of the present disclosure. Elements carrying the same reference numeral as in FIG. 2A will not be described again in detail, as they correspond to the ones already described above.

Unlike in the first embodiment, both resonators 202, 204 of the surface acoustic wave sensor 300 are now positioned at an angle $\Psi$ to the acoustic propagation direction X of the piezoelectric substrate 306 in comparison with the surface acoustic wave sensor 200 of the first embodiment. This is the only difference with respect to the first embodiment.

Thus, the propagation direction of the acoustic wave for the resonator 202 is rotated by an angle Ψ compared to the crystallographic direction X of the acoustic wave propagating substrate 306.

The resonator 204 is still positioned on the acoustic propagating substrate 206 at an angle Θ=90°. In a variant of the embodiment, another value of Θ different to 90°, for example, smaller than 90°, could be used, which would enable correction of effects such as beam steering.

Figure 3A:
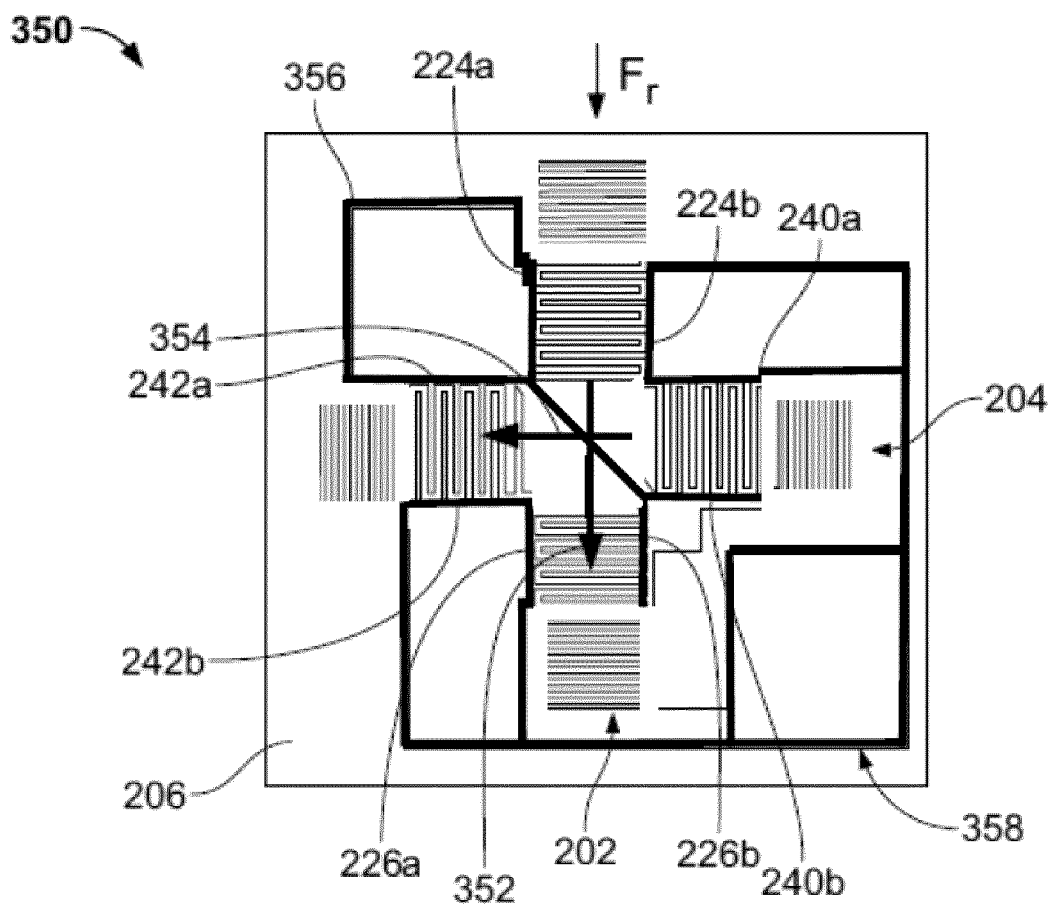
FIG. 3A shows the third embodiment of the present disclosure based on the resonator device according to the first embodiment.

FIG. 3A shows a third embodiment according to the present disclosure based on the surface acoustic wave sensor 200 according to the first embodiment. In this embodiment, the two resonators are electrically connected in a differential manner, thereby forming a differential resonator device 350. This configuration can be used to measure stress, e.g., due to the presence of radial forces. Elements carrying the same reference numeral as in FIG. 2A will not be described again in detail, as they correspond to the ones already described above.

In this embodiment, the comb electrodes 224a, 242a, 226b and 240b are electrically connected by the conductive line 356 and the comb electrodes 224b, 242b, 226a and 240a are electrically connected by the conductive line 358 to form a differential arrangement. The resonators 202, 204 are here connected in parallel and the resonator device 350 operates at resonance.

In a variant of the present disclosure, the two resonators can be connected in series and the resonator device would operate at anti-resonance operation.

The resonator device 350 according to the third embodiment allows positioning of a test area in the central cavity shared by both resonators and to conduct a measure at the same location by the two resonators, yielding an improvement in the measurement quality and also a better immunity to parasitic stress effects compared to the state of the art device described with reference to FIG. 1.

In FIG. 3A, the two resonator propagation directions, shown as arrows 352, 354, are respectively parallel and perpendicular to the direction of an applied radial force Fr yielding equal and opposed stresses for the two resonators 202, 204. Here, the two principal strain components in the substrate 206 are aligned to the two principal strain components in the object due to external radial stress. The propagation directions of the surface acoustic waves propagating through the respective resonators 202 and 204 may be respectively aligned with each of the two principal strain components of the substrate 206 and the two principal strain components of the object due to external stress. Thus, when stress is applied, one of the resonators will be in tension and the other one will be in compression. As a result, their resonant frequencies f1, f2 will change in opposite directions. By sensing the change of the difference Δf between the two resonant frequencies, one can find the applied torque M, as the difference Δf is linearly proportional to the torque M.

Sensing of the change of the difference frequency Δf permits suppression of a number of common-mode interference factors and, reduce variations due to a temperature, which should cancel out in the differential sensing arrangement.

Figure 3B:
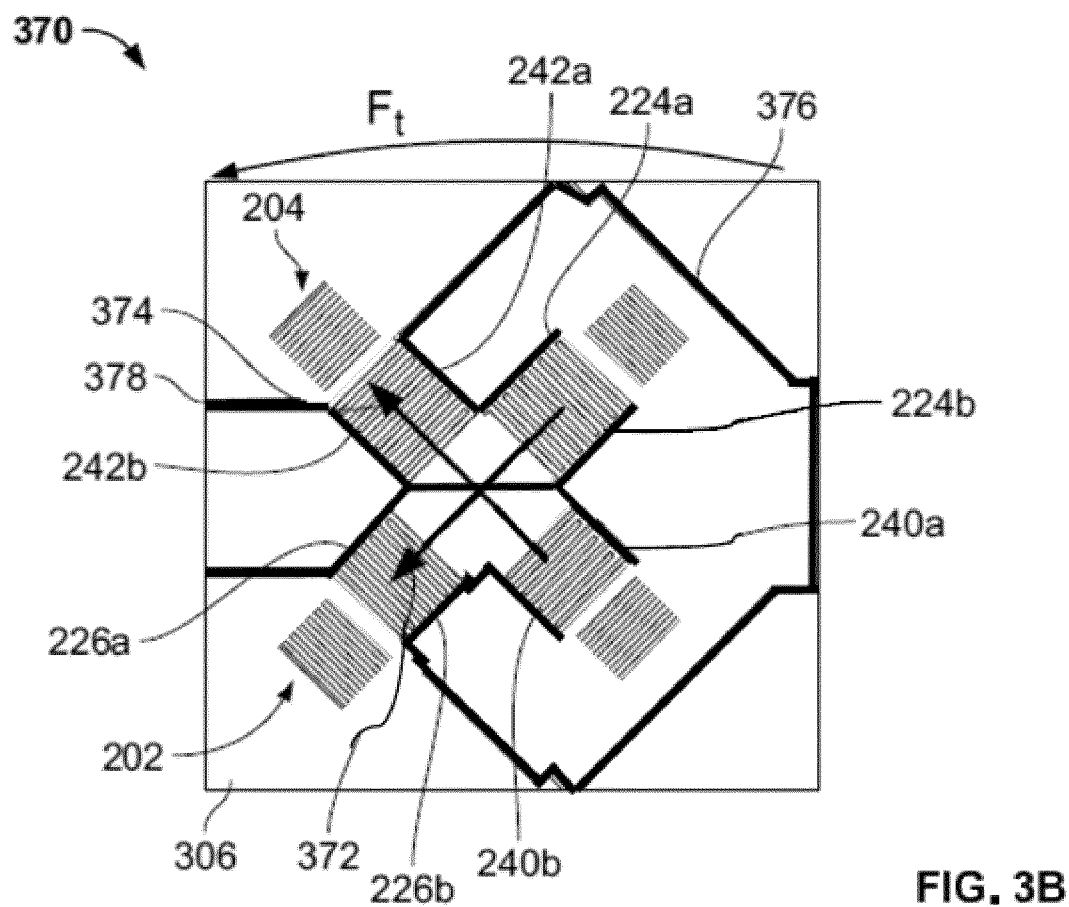
FIG. 3B shows the fourth embodiment of the present disclosure based on the resonator device according to the second embodiment.

FIG. 3B shows the fourth embodiment according to the present disclosure wherein the SAW sensor 300 according to the second embodiment is configured to measure the stress due to tangential forces. In this embodiment, the two resonators 202 and 204 are electrically connected in a differential manner, thereby forming a differential resonator device 370. This configuration can be used to measure stress, e.g., due to the presence of tangential forces. Elements carrying the same reference numeral as in FIGS. 2A and 2B will not be described again in detail, as they correspond to the ones already described above.

In this embodiment, the comb electrodes 224a, 242a, 226b and 240b are electrically connected by the conductive line 376 and the comb electrodes 224b, 242b, 226a and 240a are electrically connected by the conductive line 378 to form a differential arrangement. The resonators 202, 204 are here connected in parallel and the resonator device 370 operates at resonance.

In a variant of the present disclosure, the two resonators can be connected in series and the resonator device would operate at anti-resonance operation.

The resonator device 370 according to the fourth embodiment allows positioning of a test area in the central cavity shared by both resonators and conduction of a measure at the same location by the two resonators, yielding an improvement in the measurement quality and also a better immunity to parasitic stress effects compared to the state-of-the-art device described with reference to FIG. 1.

In FIG. 3B, the two sensor propagation directions are shown in FIG. 3B as arrows 372 and 374. In the tangential mode, the stress is orthogonal to the radial direction. It must be considered that the tangential force is exerted on the edge of the object, its central part being blocked. Therefore, due to the reaction of the fixed part, everything happens like in the case of torque. Projecting the resulting force on the two resonators yield one compressional effect for one resonator and one extensional effect for the other one resonator, thus yielding a differential mode.

The resonators 202, 204 of the SAW device 370 are laid down on a piezoelectric substrate 206 so that the surface acoustic waves propagate at an angle Ψ of ±45° relative to the crystallographic axis X of the piezoelectric substrate 206. At this angle, the contribution of temperature variations of third order elastic constants of the substrate 206 to the temperature variation of the Force sensitivity, is substantially equal and opposite to the sum total of variations in linear temperature coefficient of expansion, non-zero third order elastic constants, temperature variation of contributions caused by first order elastic constants, and temperature variations of substrate density. Thus, the resonator device 370 achieves a reduction of tangential force sensitivity variation with temperature.

The resonator device according to the present disclosure thus operates as a differential sensor in differential mode to segregate the two considered mechanical effects of radial, see FIG. 3A, and tangential force, see FIG. 3B.

Figure 3C:
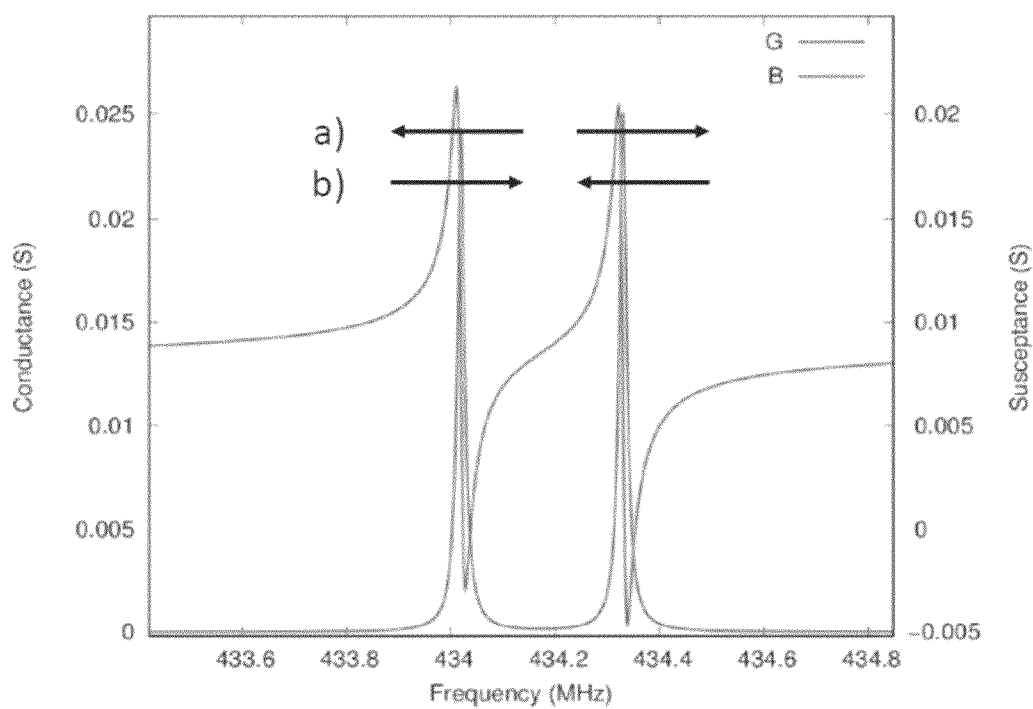
FIG. 3C shows the electrical admittance simulation of a resonator device according to the first to fourth embodiment of the present disclosure.

FIG. 3C shows the electrical admittance simulation of a surface acoustic wave device according to the second embodiment of the present disclosure, as illustrated in FIG. 2B. For this simulation, a Quartz substrate with a (YXlt)/39o/±45° cut was used. The aperture of both resonators is 300 μm, the cavity length is 361 μm, the pitch in the inter-digitated transducer structure of the first resonator is 3.74 μm and 3.743 μm in the mirror, for the second resonator, these values are 3.735 μm and 3.738 μm, respectively. To reduce spurious resonance on the resonator spectrum signature, small gaps (300 nm and 500 nm) between the transducer structures and the associated mirrors were introduced. The metal thickness (AlCu) is 245 nm. All the gratings operate at Bragg conditions. Mirrors are composed of 300 strips and the resonators of 120 (2×60) and 140 (2×70) finger pair for impedance matching and the resonators are slanted to compensate the beam steering (4°). The two resonators of the surface acoustic wave device are positioned at an angle of 90° to each other, thus in a cross-type formation. Furthermore, the two resonators are positioned at an angle of ±45° to the propagation direction X of the quartz substrate. The resonators are identically split into two parts, both parts being symmetrical to each other, and a central acoustic cavity shared by both resonators can be seen as described in FIGS. 2A and 2B.

The electrical admittance graph plots the conductance (S) and the susceptance (S) on the right and left Y axis, respectively, in function of the frequency (MHz) on the X axis. As two resonators are present, two resonance peaks are visible in the electrical admittance graph, slightly above 434 MHz and slightly above 434.3 MHZ, respectively, for both the real part of the admittance (conductance G) and the imaginary part of the admittance (susceptance B). The two resonance peaks are balanced to approach a 50Ω matching within the 434 MHz centered ISM-band.

When a radial force is applied to the device, as in the third embodiment of the present disclosure as shown in FIG. 3A, the applied radial force Fr yields equal and opposed stresses for the two resonators 202, 204. Here, the two principal strain components in the substrate 206 are aligned to the two principal strain components in the object due to the applied stress. The propagation directions of the surface acoustic waves propagating through the respective resonators 202 and 204 are respectively aligned with each of the two principal strain components of the substrate 206 and the two principal strain components of the object due to stress. Thus, when radial stress is applied, one of the resonators will be in tension and the other one will be in compression. As a result, their resonant frequencies f1, f2 will change in opposite directions, as shown in FIG. 3C with the arrows of case a) and b). The change in Δf between the two resonant peaks is then proportional to the applied force F.

In contrast to the state of the art, the resonators 202 and 204 have a common cavity 222, which corresponds to the location where the measurement is made for both resonators 202, 204. Thus, both resonators will measure at the same location and a more accurate value of the applied force will be obtained, compared to the value obtained with a state-of-the-art device as shown in FIG. 1.

Figure 4A:
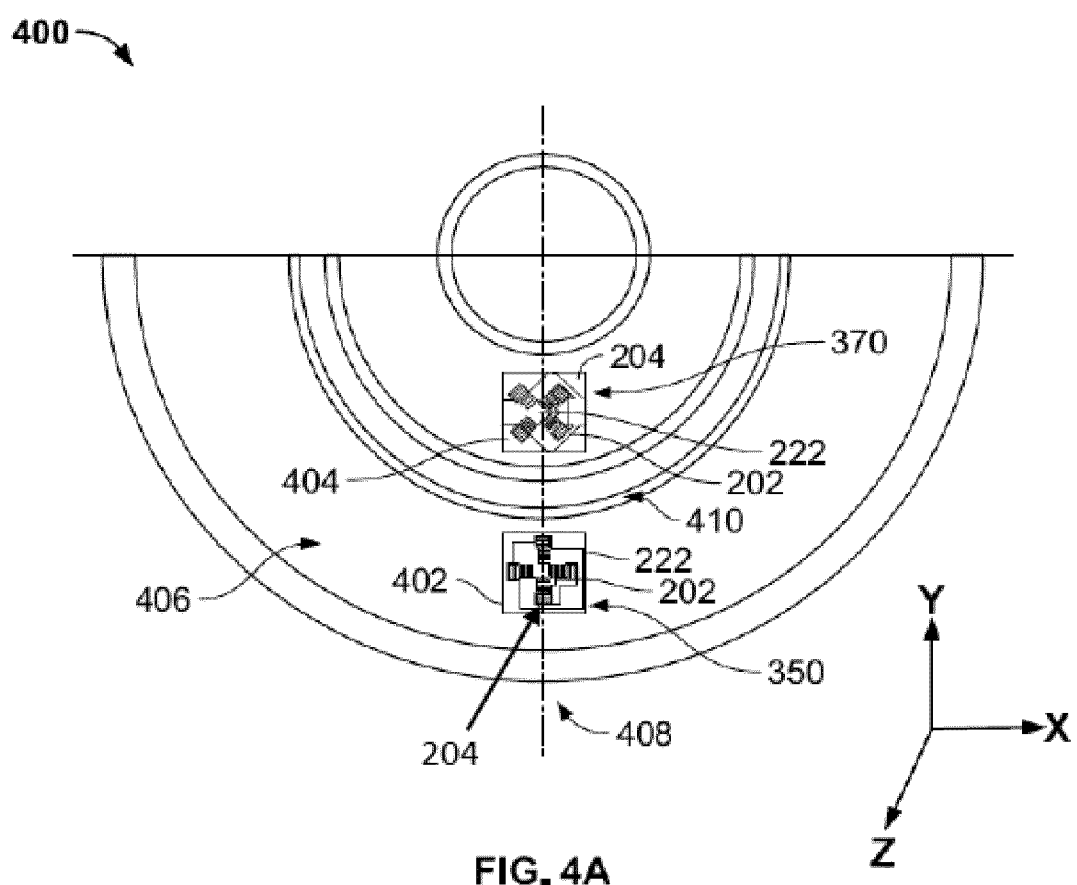
FIG. 4A shows the sensing device according to a fifth embodiment of the present disclosure.

FIG. 4A shows a sensing device according to a fifth embodiment of the present disclosure.

In FIG. 4A, the sensing device 400 comprises two differential sensors 350 and 370 according to the third and fourth embodiment of the present disclosure, respectively.

In the embodiment of FIG. 4A, the differential sensors 350 and 370 are each located on a quartz dice 402, 404. In a variant of the embodiment, the same quartz dice could comprise both differential sensors 350 and 370. They are not described again in detail, but reference is made to their description above.

Both quartz dice 402, 404 are positioned on an object 406, in order to measure e.g., the stress generated by tangential and radial forces on the object 406. In FIG. 4A, the object is a wheel. The quartz dice 402 and 404 are positioned on the same radial line 408, the quartz dice 404 closer to the center of the object 406 than the quartz dice 402. The quartz dice position on the object 406 could also be swapped so that the quartz dice 402 is the one closer to the center of the object 406.

The quartz dices 402, 404 are glued onto the object 406, which comprises a steel plate at that position, with cyano-acrylate glue (M-bond 200) but any other glue or solid-state attachment techniques could be used.

The resonators 202, 204 are split into two parts, as described in the third and fourth embodiment, so that the differential sensors 350 and 370 each comprises a central cavity 222, shared by the two resonators 202, 204 of each sensor 350, 370.

In this embodiment, the differential sensor 370 is configured to measure the stress on the object 406 due to the tangential forces while the other differential sensor 350 is configured to measure the stress on the object 406 due to radial forces as explained above.

Both differential sensors 350, 370 are connected to an antenna 410, to transmit the measurements. In a variant of the embodiment, each differential sensor can have its own antenna.

According to the present disclosure, the stress resulting from the forces applied to the object 406 and sensed by the sensors 350, 370 is measured at the same location at the central cavity 222 for each sensor 350, 370, yielding an improvement in the measurement quality and a better immunity to parasitic stress effects.

In a variant, the sensing device 400 can comprise more than two differential sensors according to the present disclosure.

In another variant of the present disclosure, the sensing device 400 can be applied to any other object, and not only a wheel, in order to measure concomitantly the stress due to the radial and tangential forces experienced by the object. Other physical parameters, outside of stress, can also be measured with the sensing device 400. For example, torsional effects and torque can also be measured or any other physical parameter not related to stress.

In another variant of the present disclosure, the sensing device 400 can measure the stress due by the radial and tangential forces experienced by the object at the same location. The four resonators of the sensing device would share the same resonant cavity.

Figure 4B:
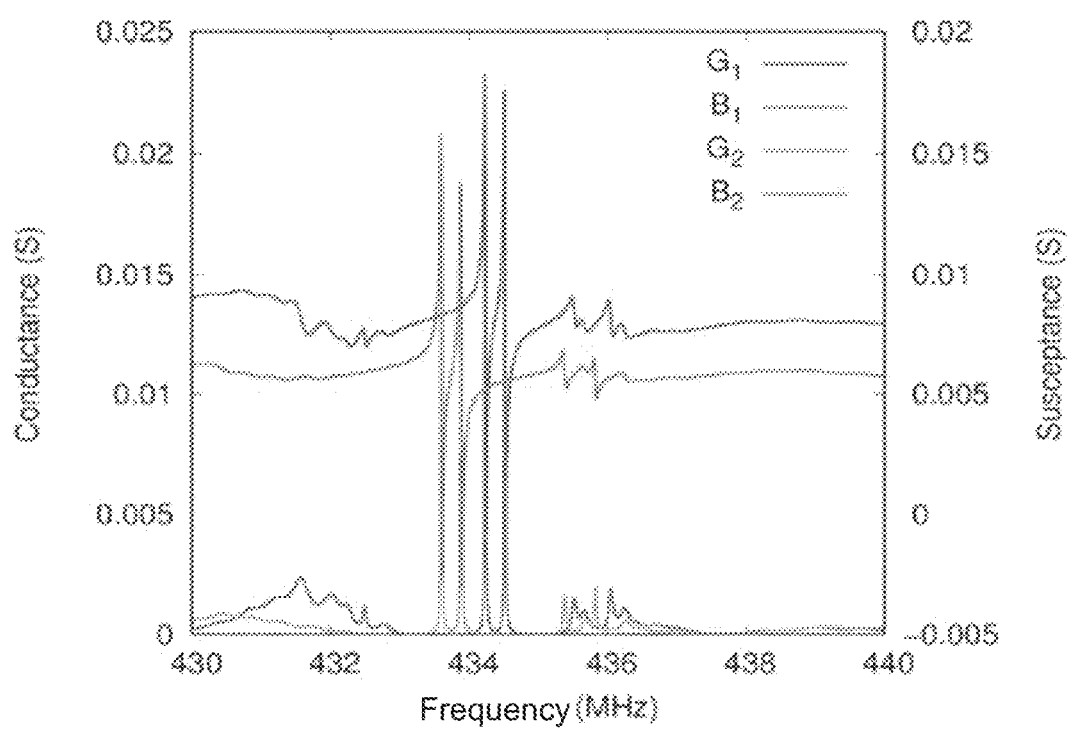
FIG. 4B shows the electrical measurements of the sensing device according to the fifth embodiment of the present disclosure.

FIG. 4B shows the electrical admittance simulation of the sensing device according to the fifth embodiment of the present disclosure. The sensing device 400 as shown in FIG. 4A comprises two differential sensors 350, 370, each comprising two resonators 202, 204. The differential sensor 350 is according to the third embodiment as described in FIG. 3A and the differential sensor 370 is according to the fourth embodiment as described in FIG. 3B.

The electrical admittance graph plots the conductance (in Siemens-S) and the susceptance (in S) on the right and left Y axis, respectively, in function of the frequency (MHz) on the X axis. As two differential sensors are present, each comprising two resonators, four resonance peaks are visible in the electrical admittance graph, slightly above and below 434 MHz, for both the real part of the admittance (conductance G) and the imaginary part of the admittance (susceptance B). The resonance peaks of each resonator are balanced to approach a 50Ω matching within the 434 MHz centered ISM-band.

FIGS. 5A to 5D, FIGS. 6A, 6B, and FIGS. 7A to 7E show multiple variants of the resonator device according to the present disclosure.

The basic structure corresponds to the one of the first embodiments and only the differences with respect to that one will be described. Thus, the features common with the first embodiment of FIG. 2A will not be described in detail again but reference is made to their description above. Furthermore, the variants will be shown based on the structure of the first embodiment, but they can be applied to the structure of the second, third or fourth embodiments as well.

Figure 5A:
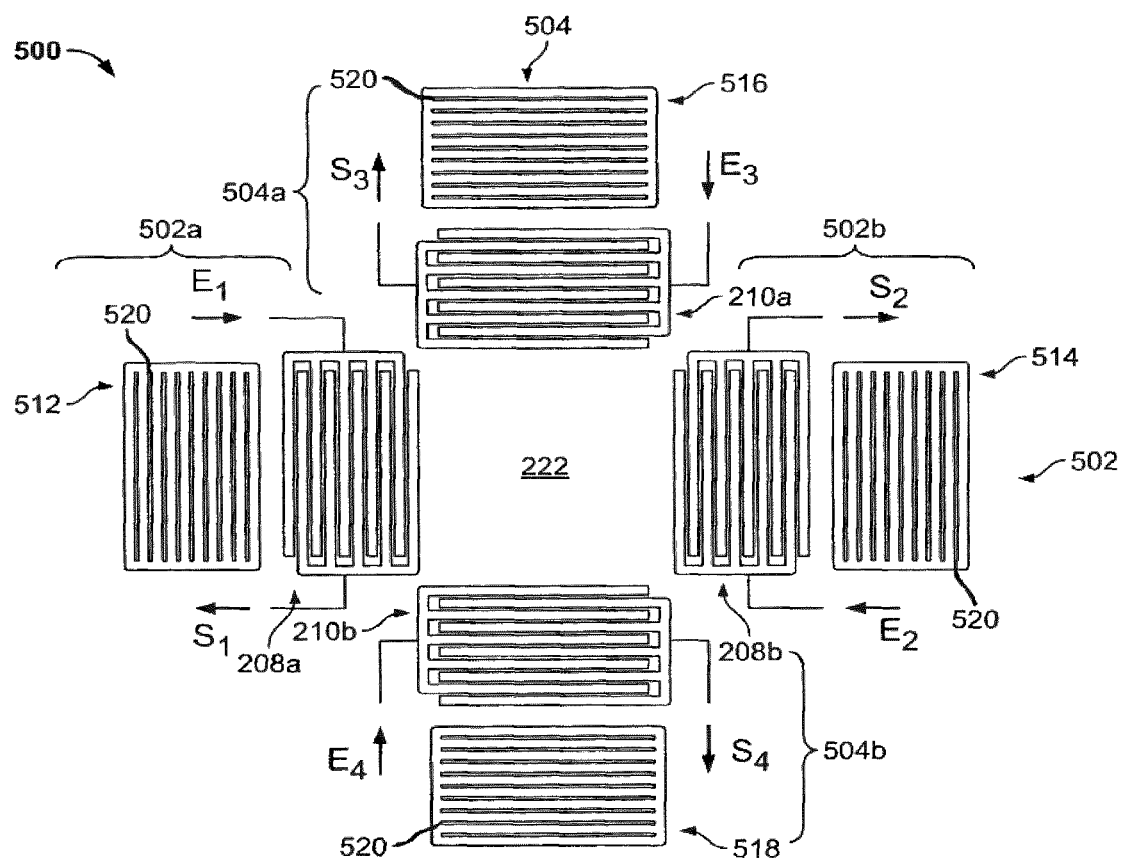
FIG. 5A shows the resonator device according to a first variant of the first and second embodiments of the present disclosure.

FIG. 5A shows a variant of the first embodiment of FIG. 2A, where the reflecting structures 512, 514, 516 and 518 of the resonators 502, 504 comprises metallic strips 520, which are connected to each other and/or shortened. This results in an improvement of the reflection coefficient of the reflecting structures at the Bragg condition. At the Bragg condition, the reflected waves due to electrical and mechanical loading are in phase so that an improved reflection coefficient of the reflecting structures 512, 514, 516 and 518 or at the Bragg condition results in a better detection of the reflected waves by the corresponding transducer structure 208a, 208b and 210a, 210b.

The resonator device 500 as described in this variant enables management of parasites due to directivity effects.

Figure 5B:
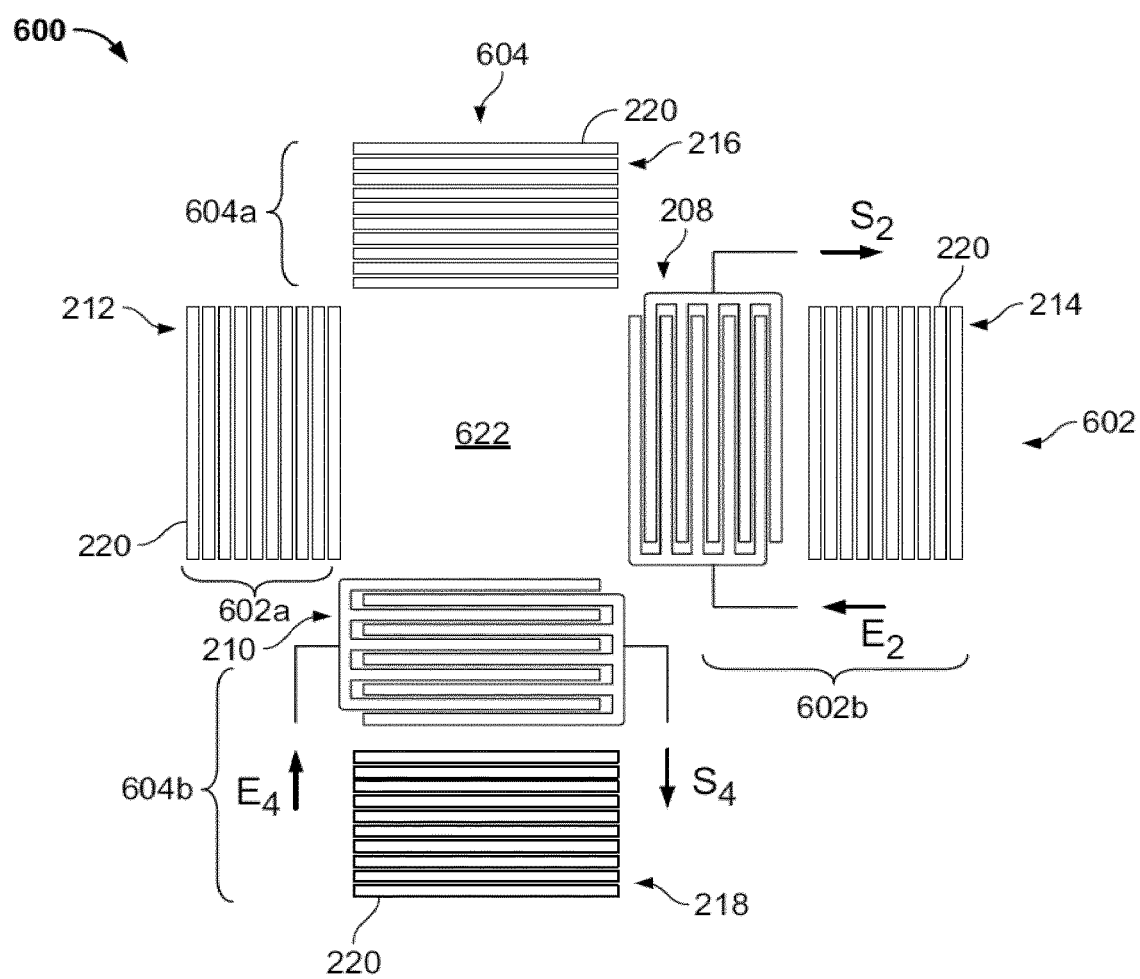
FIG. 5B shows the resonator device according to a second variant of the first and second embodiments of the present disclosure.

FIG. 5B shows a variant of the first embodiment where the split parts of the resonators 602, 604 are not identical or symmetrical with respect to the cavity 622. In FIG. 5B, the split occurs between the transducer structure 208, 210 and one of the reflecting structures 212, 216 of the resonators 602, 604, respectively. The split part 602a of the resonator 602 comprises only the reflecting structure 212. The split part 602b of the resonator 602 comprises the entire transducer structure 208 and the reflecting structure 214. Correspondingly, the split part 604a of the resonator 604 comprises only the reflecting structure 216. The split part 604b of the resonator 604 comprises the entire transducer structure 210 and the reflecting structure 218. The cavity 622 is not perfectly in the center of the two resonators 602, 604 but is still shared by both resonators 602, 604.

The resonator device 600 as described in this variant enables management of parasites due to directivity effects.

Figure 5C:
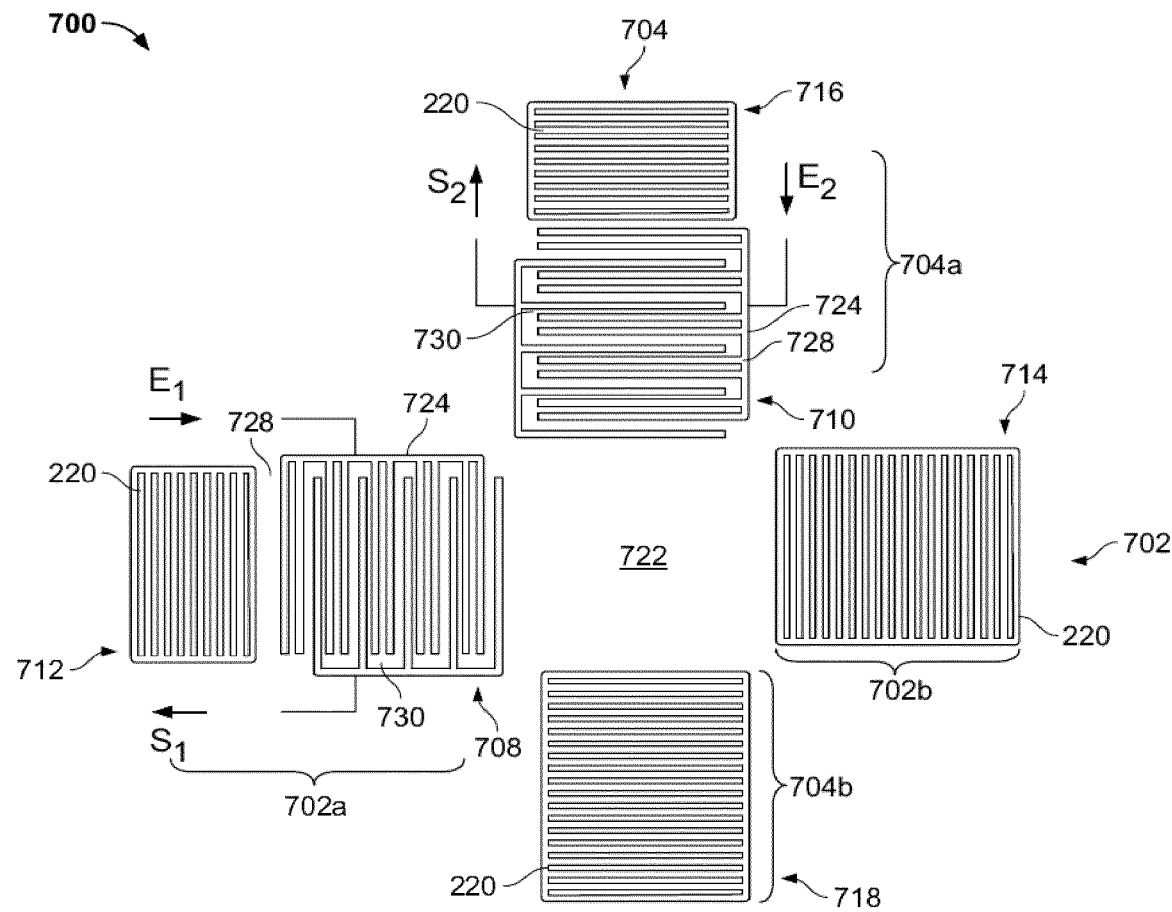
FIG. 5C shows the resonator device according to a third variant of the first and second embodiments of the present disclosure.
Figure 6A:
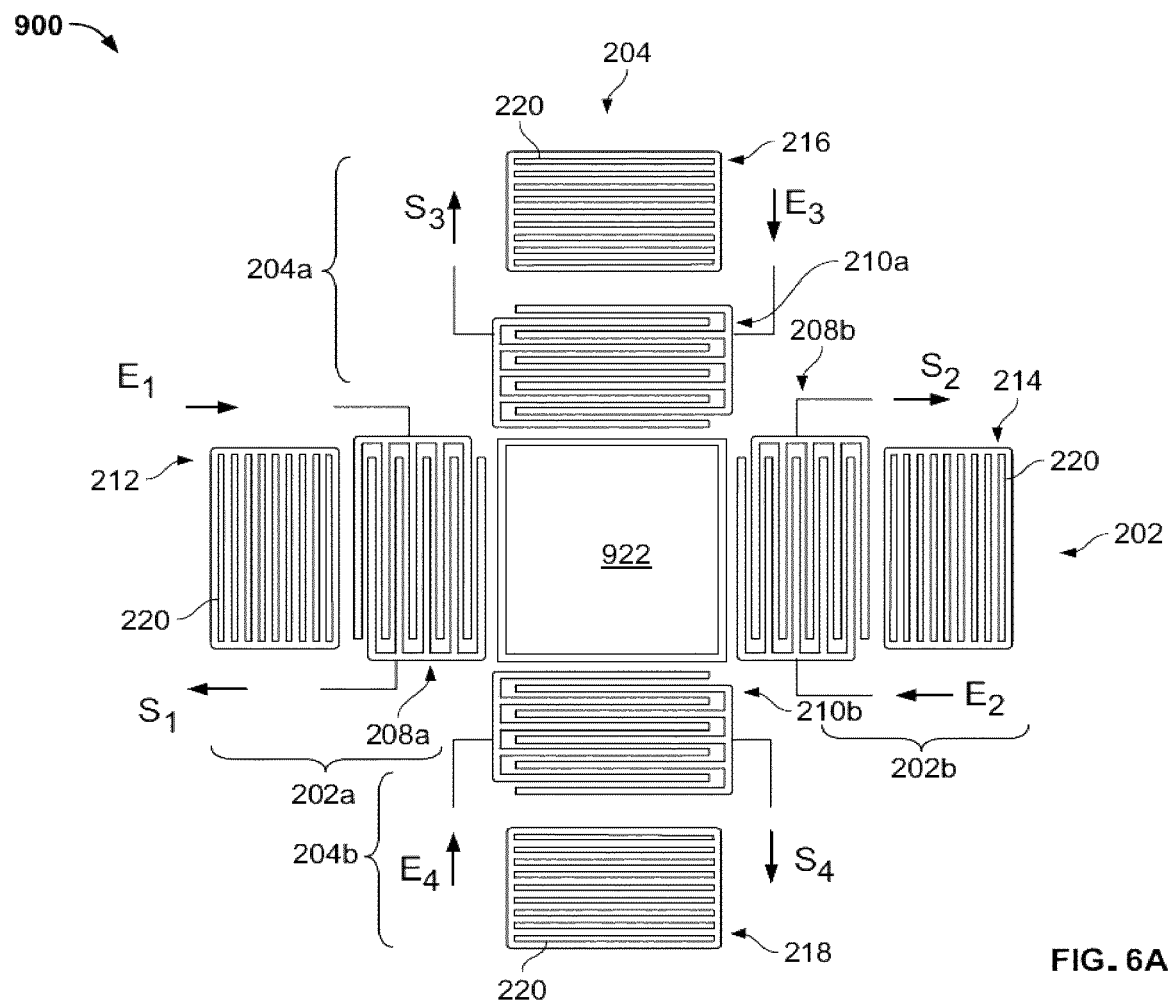
FIG. 6A shows the resonator device according to a fifth variant of the first and second embodiments of the present disclosure.
Figure 6B:
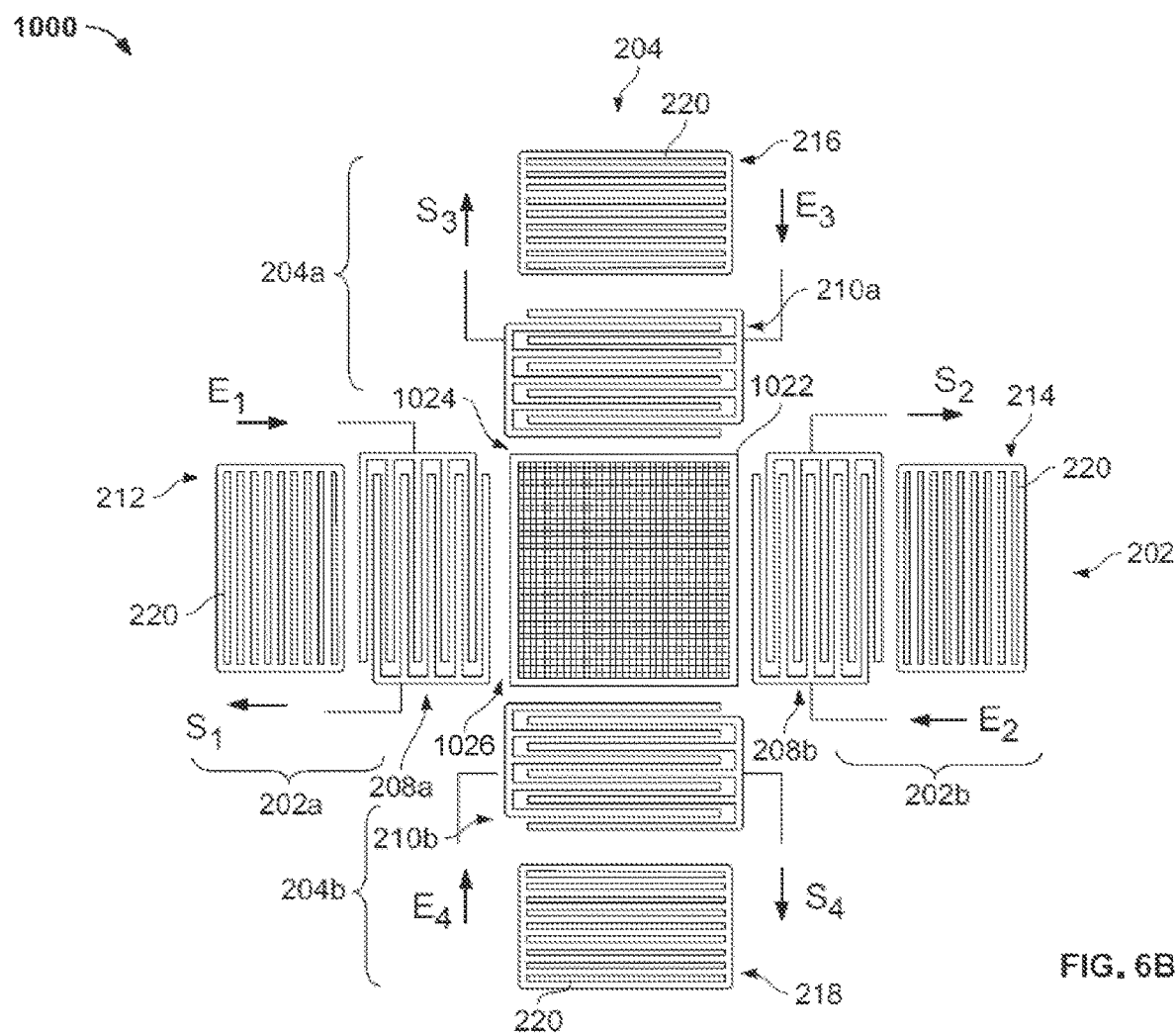
FIG. 6B shows the resonator device according to a sixth variant of the first and second embodiments of the present disclosure.

FIG. 5C shows a further variant of FIG. 6B, thus, of the first embodiment, where the transducer structure 708, 710 of the resonators 702, 704 comprises electrode means in the form of split fingers 728. The split fingers 728 each comprise two directly adjacent electrode fingers belonging to the same comb electrode 724. Thus, the transducer structures 708, 710 do not operate at the Bragg conditions.

Furthermore, the split parts of the resonators 702, 704 are also different and not symmetric with regards to the cavity 722, as the reflecting structures 712, 714 and 716, 718 are not identical within a resonator 702, 704, respectively. For the resonator 702, the reflecting structure 714 comprises more metallic strips 120 as the reflecting structure 712 (same thing for the resonator 704). The metallic strips 120 are also connected to each other and/or shortened. In a variant, they can also not be connected to each other.

Here, like in the second variant of the first embodiment, the split part of a resonator comprises a reflecting structure alone and the other split part of the resonator comprises the full transducer structure and the other reflecting structure adjacent the transducer structure. Again, the cavity 722 is not central within the resonators 702, 704, but is still shared by the two resonators 702, 704.

The resonator device 700 as described in this variant enables management of parasites due to directivity effects.

Figure 5D:
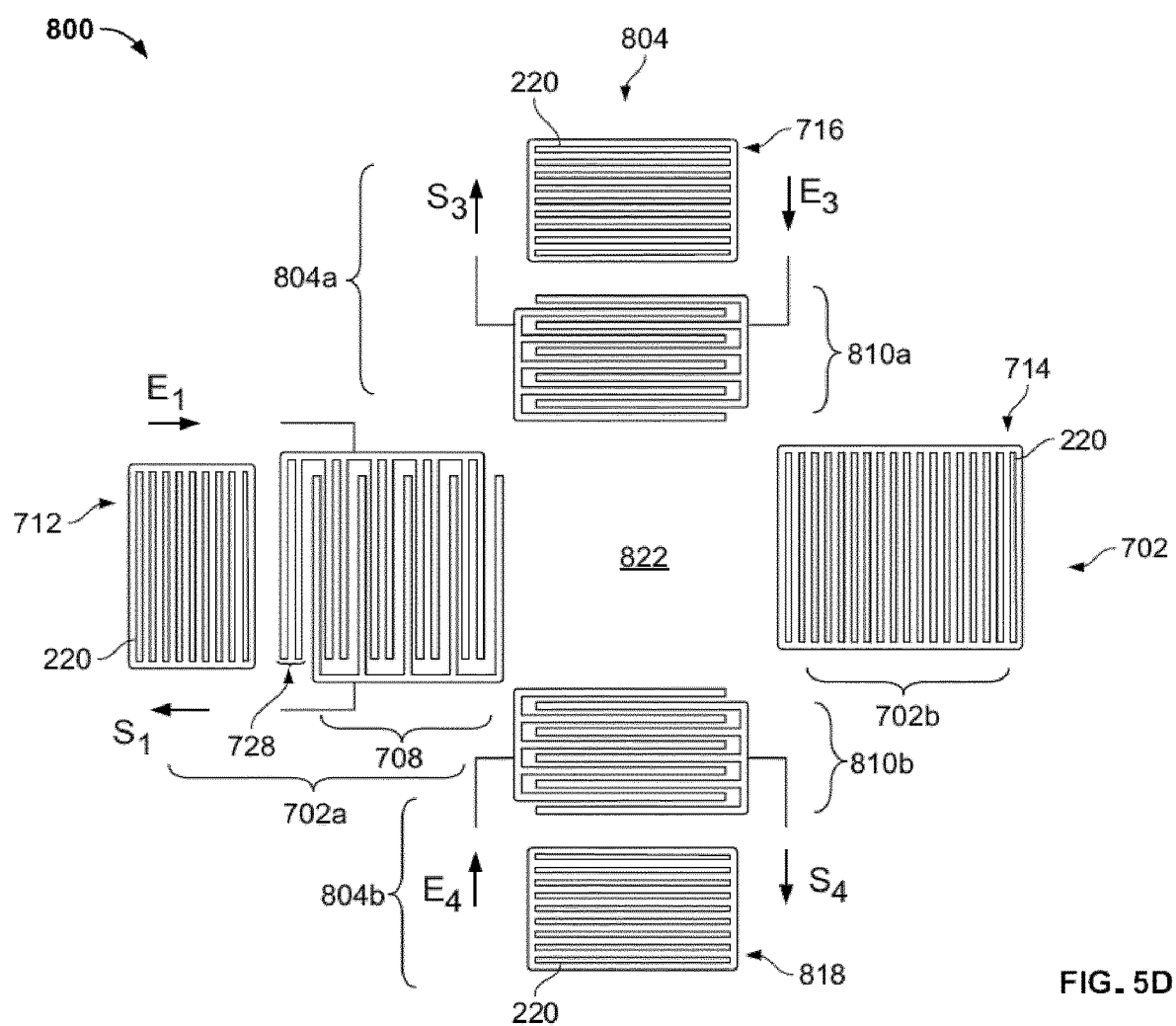
FIG. 5D shows the resonator device according to a fourth variant of the first and second embodiments of the present disclosure.

FIG. 5D shows a further variant of FIG. 5C, where the transducer structures 708, 810 of the resonators 702, 804 are different. The resonator 702 corresponds to the resonator of FIG. 5C, wherein the transducer structure 708 comprised split fingers 728 as electrode means and thus, does not work at the Bragg condition. In the contrary, the resonator 804 is the same as in FIG. 2A and the transducer structure 804 works at the Bragg condition and is a 2-finger-per-wavelength inter-digitated transducer (IDT). Again, like in FIG. 2A, the split parts 804a and 804b of the resonator 804 each comprise a reflecting structure 716, 818 and a part of the transducer structure 810a, 810b, respectively. While for the resonator 702, one split part 702a comprises the reflecting structure 712 and the entire transducer structure 708 and the other split part 702b comprises only a reflecting structure 714.

The metallic strips 120 of the reflecting structures 712, 714 and 716, 818 are also connected to each other and/or shortened. In a variant, they can also not be connected to each other.

The resonator device 800 as described in this variant enables management of parasites due to directivity effects.

FIG. 6A shows a variant of the first embodiment where the cavity 922 of the differential sensor 900 is metalized. The cavity 922 is a central cavity, as shown in FIG. 2A. The metallization of the cavity 922 can be done on the whole surface as shown in FIG. 6A, but it can also be done only on part of the surface of the cavity 922. Thus, the surface of the cavity 922 can be fully metalized or partially metalized.

Again, the metallic strips 120 of the reflecting structures 212, 214 and 216, 218 are also connected to each other and/or shortened. In a variant, they can also not be connected to each other.

The resonator device 900 as described in this variant enables filtering or selection of the possible modes of the structure or even allows operation in a coupled mode configuration.

FIG. 6B shows the variant of the first embodiment where the cavity 1022 of the differential sensor 1000 comprises one or more gratings 1024, 1026. The grating 1024, 1026 can be a metal grating, deposited on top of the surface of the cavity 1022, or it can also be an etched grating. When a single grating is present, it can be a one direction grating. When multiple gratings are present, the gratings 1024, 1026 can be superimposed within the surface of the cavity 1022, as shown in FIG. 6B. In a variant, the gratings 1024, 1026 can be located within the full surface of the cavity 1022 or only partially within the surface of the cavity 1022.

Again, the metallic strips 120 of the reflecting structures 212, 214 and 216, 218 are also connected to each other and/or shortened. In a variant, they can also not be connected to each other.

The surface acoustic wave device 1000 as described in this variant enables filtering or selection of the modes of the structure or even enables operation in a coupled mode configuration.

Figure 7A:
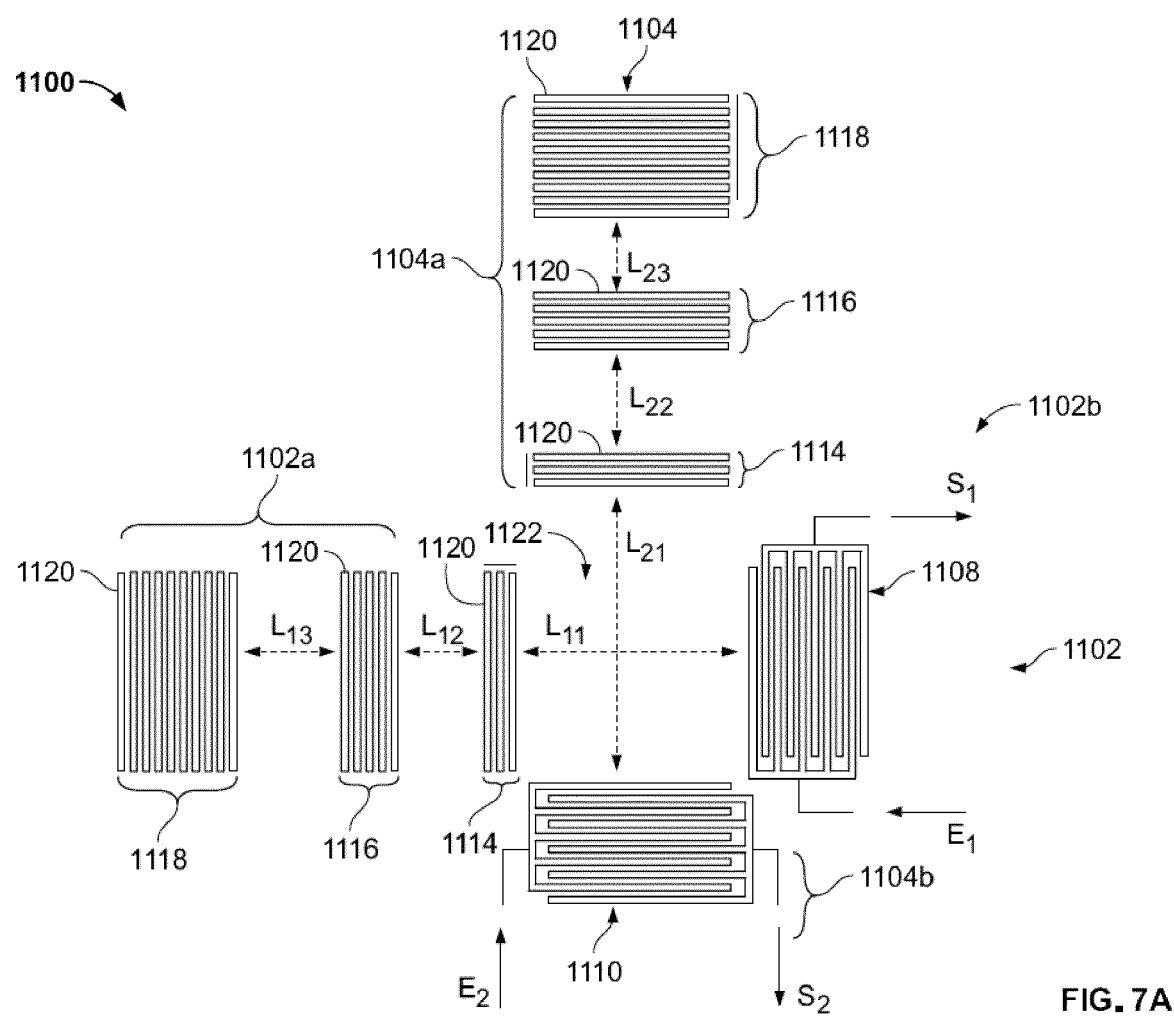
FIG. 7A shows the resonator device according to a seventh variant of the first and second embodiments of the present disclosure.

FIG. 7A shows the surface acoustic wave differential sensor 1100 according to a seventh variant of the first embodiment of the present disclosure.

In this variant, the reflecting structures of the resonators 1102, 1104 comprise a plurality of reflectors, each comprising more or less metallic strips 1120. In this variant, the resonators 1102, 1104 are SAW tag devices. SAW tag devices are sensors, which can be remotely interrogated, providing a wireless measurement of a physical quantity. Whatever this physical quantity is, it is better to put in place differential measurement to guarantee the measurement of an absolute physical quantity or to suppress correlated external perturbations affecting the sensor.

Two SAW-tags are used in a way that only the two first echoes are used to determine the stress value, the other echoes may be used as identification marks and/or as other physical effect markers (for instance, temperature).

The SAW tag device 1102 comprises a transducer structure 1108, in particular, only one transducer structure, and a set of reflectors 1114, 1116 and 1118, positioned at various delays on one side of the transducer structure 1108 in the direction of propagation X as shown in FIG. 7A. These reflectors 1114, 1116, and 1118 usually comprise one or more metallic strips 1120, e.g., aluminum strips. The SAW tag device 1102, 1104 also comprises an antenna (not shown) connected to the transducer structure 1108, 1110.

The SAW tag device 1104 is the same as the SAW tag device 1102 but its set of reflectors 1114, 1116, and 1118, positioned at various delays on one side of the transducer structure 1110 in the direction of propagation Y as shown in FIG. 7A.

The SAW tag devices 1102, 1104 are actually split in two parts 1102a and 1102b, 1104a and 1104b, between the inter-digitated transducer structures 1108, 1110 and the first reflector 1116, so that one part of the split SAW tag 1102a, 1104a comprises the set of reflectors 1114, 1116, and 1118 or delay line and the other part 1102b, 1104b of the SAW tag devices 1102, 1104 comprises only the inter-digitated transducer structure 1108, 1110.

The inter-digitated transducer structures 1108, 1110 are operating at Bragg conditions but could operate out of this condition. The reflectors 1114, 1116 and 1118 are in open circuit mode. The distances L11, L12, L13 and L21, L22 and L23 between the reflectors 1114, 1116 and 1118 and the transducer structure 1108, 1110 are chosen such that the corresponding echoes do not overlap over the whole measurement range. The cavity 1122 is shared by both resonators 1102, 1104, although the cavity 1122 is not centrally located between the two resonators 1102, 1104, since the split parts 1102a and 1102b and the split parts 1104a and 1104b of both resonators 1102, 1104 are not the same and not symmetric to each other.

Figure 7B:
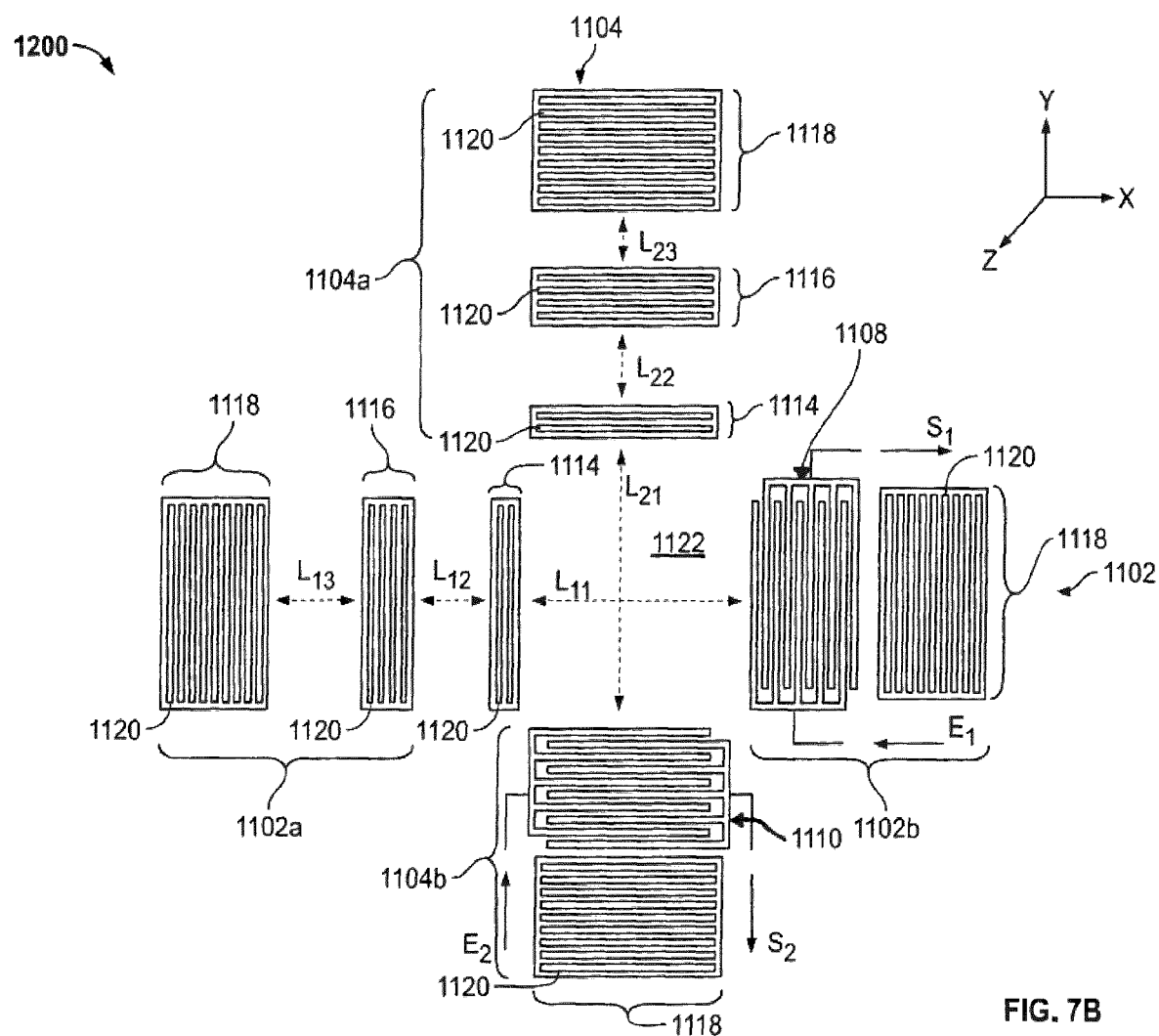
FIG. 7B shows the resonator device according to an eight variant of the first and second embodiments of the present disclosure.

In the variant shown in FIG. 7B, the split part 1102b and 1104b comprises a reflecting structure 1118 and the inter-digitated transducer structure 1108, 1110, respectively. The inter-digitated transducer structures 1108, 1110 are operating at Bragg conditions but could operate out of this condition, they are associated here with a reflecting structure 1118 to reflect and launch all the energy toward the obstacle, the mirrors on which the waves partially reflects are shorten and both delay lines are identical. The distances L11, L12, L13 and L21, L22 and L23 between the reflectors 1114, 1116, 1118 and the transducer structures 1108 and 1110 are chosen such that the corresponding echoes do not overlap over the whole measurement range.

Figure 7C:
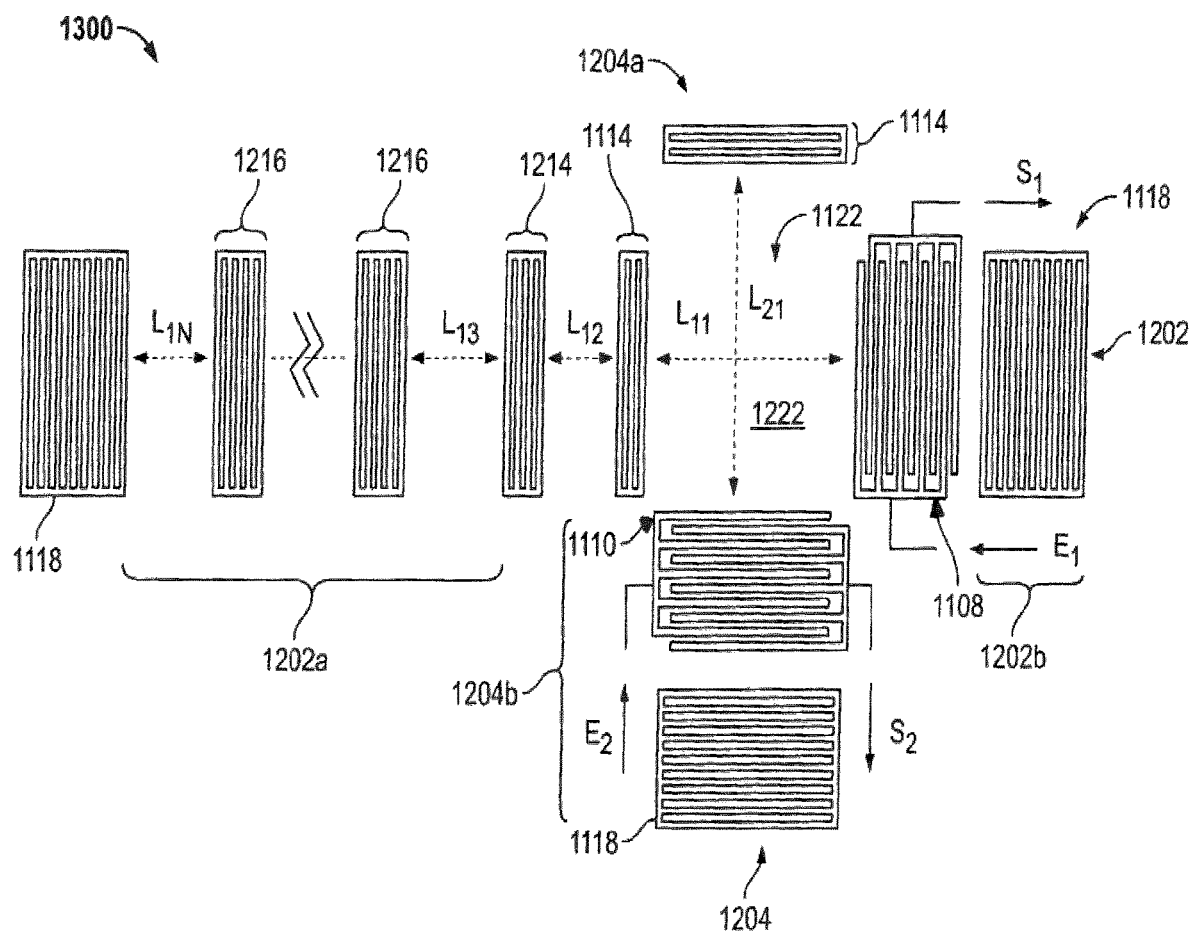
FIG. 7C shows the resonator device according to a ninth variant of the first and second embodiments of the present disclosure.

In the variant in FIG. 7C, the surface acoustic wave device 1300 is a variant of the device 1200 of FIG. 7B, where the split part 1204a of the resonator 1204 only comprises one reflecting structure 1114 and the split part 1202a of the resonator 1202 comprises more reflectors than the split part 1102a of the device 1200. In this variant, both resonators 1202 and 1204 are different, although both are SAW tag devices. The resonator 1204 or SAW tag 1204 comprises a lot more reflectors than the SAW tag 1202.

Again, the cavity 1222 is shared by both resonators 1202, 1204, although the cavity 1222 is not centrally located between the two resonators 1202, 1204, since the split parts 1202a and b and the split parts 1204a and b of both resonators 1202, 1204 are not the same and not symmetric to each other.

The metallic strips 1120 of the reflectors 1118, 1116, and 1114 are also connected to each other and/or shortened. In a variant, they can also not be connected to each other.

The resonator device 1500, as described in this variant, measures the stress at the cavity 1422, which is located within the first transducer-reflector gap of the longest SAW tag 1202. The cavity 1422 is defined by the gap L11 and L21. In another variant, one SAW tag can share more than one cavity with the other SAW tags or resonators. This would enable measurement of a distribution of stress.

Figure 7D:
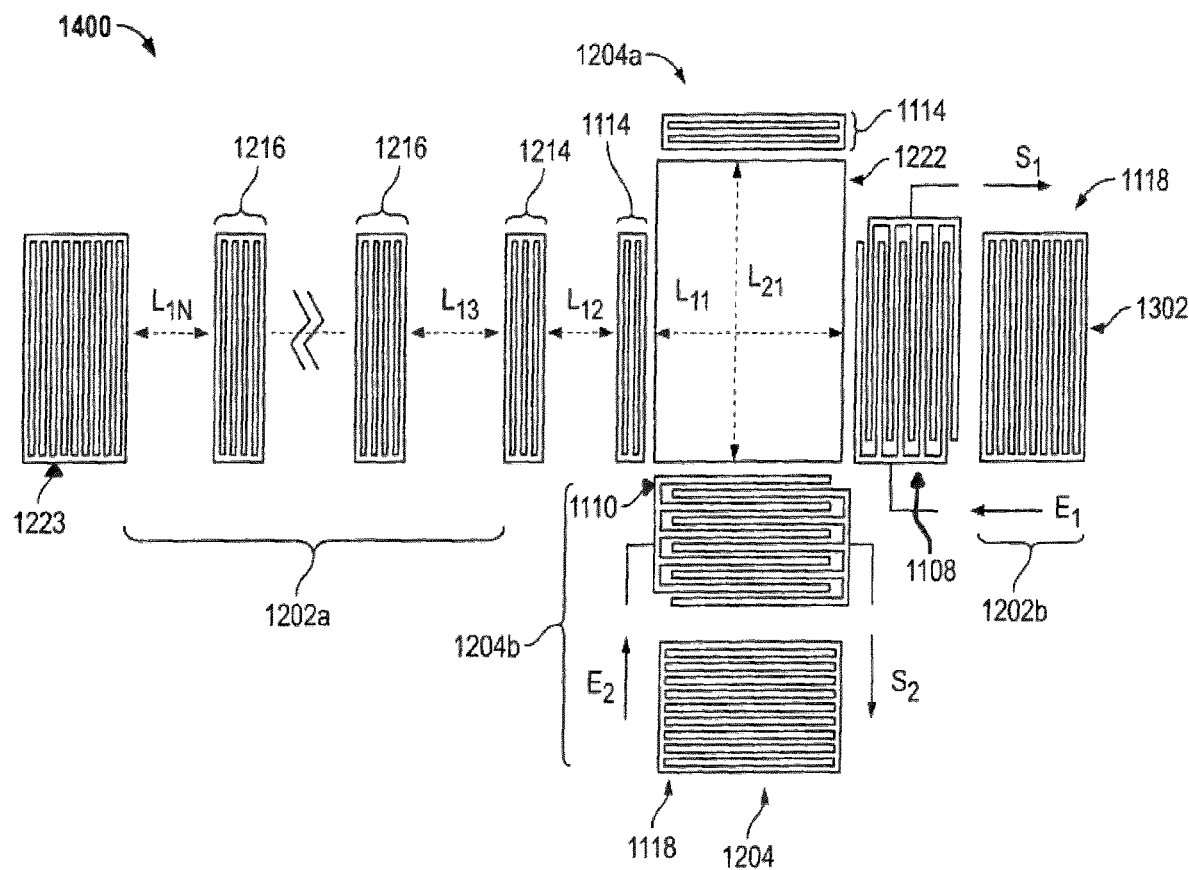
FIG. 7D shows the resonator device according to a tenth variant of the first and second embodiments of the present disclosure.

FIG. 7D is a variant of the resonator device 1300 of FIG. 7C, where the cavity 1222 is metallized. The metallization of the cavity 1222 can be done on the whole surface as shown in FIG. 7D, but it can also be done only on part of the surface of the cavity 1222. Thus, the surface of the cavity 1222 can be fully metalized or partially metalized. In a variant, the cavity 1222 can also comprise a metallic grating or more than one metallic grating superimposed to each other. In another variant, the cavity surface can be partially or fully covered by an active layer. For example, the active layer could be sensitive to a magnetic field. Therefore, by magnetostriction, the film may experience stresses that can be detected according to the present disclosure. The active layer could also be a layer that changes its properties when exposed to gas, e.g., palladium and hydrogen.

The resonator device 1400 as described in this variant enables increasing the sensor sensitivity or more generally optimization of the sensor operation.

Figure 7E:
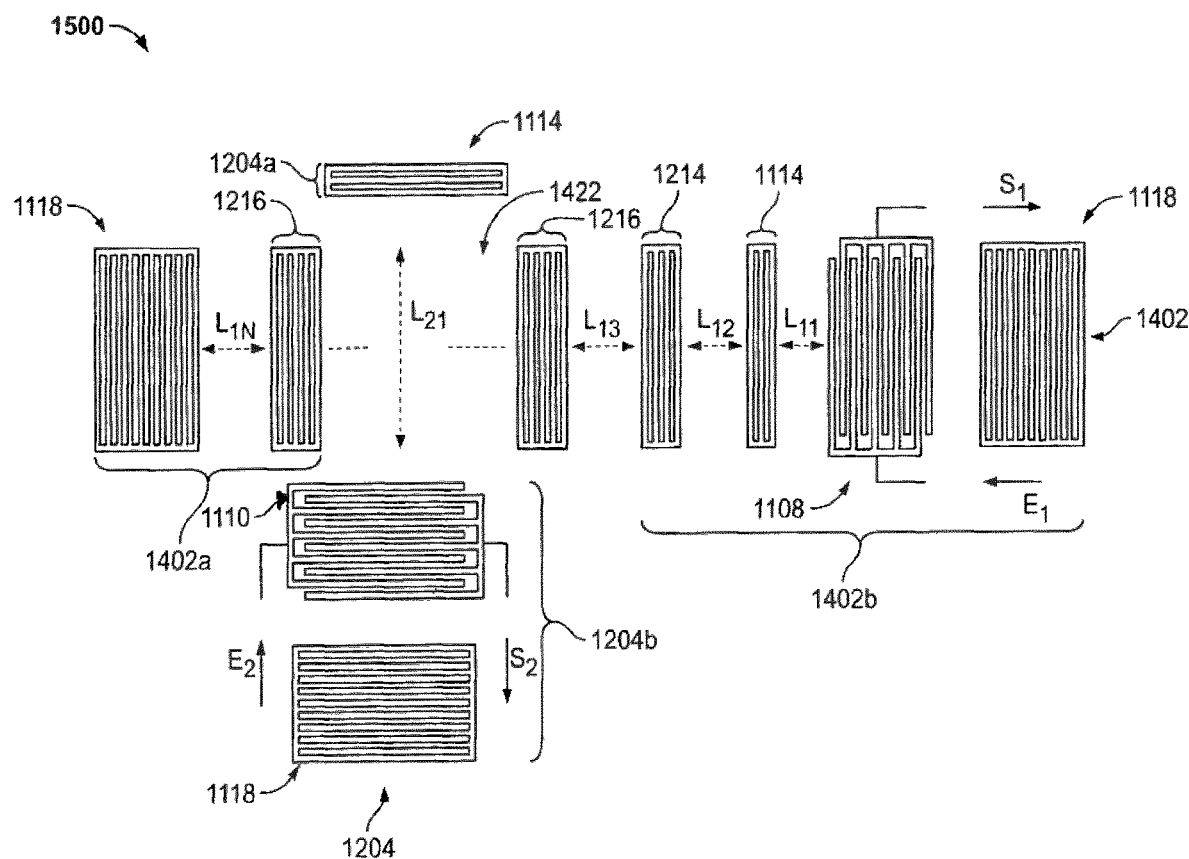
FIG. 7E shows the resonator device according to an eleventh variant of the first and second embodiments of the present disclosure.

FIG. 7E is a variant of the resonator device 1300 of FIG. 7C, where the splitting of the resonator 1202 is done in between the delay lines or reflectors 1114, 1116 and 1118, such that the split part 1202b of the resonator 1202 comprises now some reflectors 1114, 1116 and 1118 on one side of the transducer structure 1108 with the transducer structure 1108 and the reflecting structure 1118 on the other side of the transducer structure 1108. The resonator 1204 is the same as in FIG. 7C.

The resonator device 1500 as described in this variant measures the stress at the cavity 1422, which is located anywhere else on the delay line of the resonators but between the first transducer-reflector gap, defined by the distance L11 and L21, of the longest SAW tag 1202.

A number of embodiments of the present disclosure have been described. Nevertheless, it is understood that various modifications and enhancements may be made without departing from the scope of the invention as defined by the following claims.

The invention claimed is:

1. A resonator device for measuring stress, comprising:
    at least two resonators, each resonator comprising an inter-digitated transducer structure arranged between two reflecting structures on or in a piezoelectric substrate;
    wherein the at least two resonators are arranged and positioned such that they have two different wave propagation directions;
    wherein each resonator comprises at least two parts with an area between the two parts of the at least two resonators forming a cavity, wherein the cavity is shared by the at least two resonators; and
    wherein each of the at least two parts of the at least two resonators comprises at least one reflecting structure and a part of the inter-digitated transducer structure of the corresponding resonator.

2. The resonator device of claim 1, wherein the inter-digitated transducer structure of the resonator comprises inter-digitated comb electrodes, and wherein, for at least one transducer structure of the at least two resonators, the inter-digitated comb electrodes are defined by the Bragg condition given by $p=\lambda/2$, $\lambda$ being the operating acoustic wavelength of the transducer structure and p being an electrode pitch of the transducer structure.

3. The resonator device of claim 1, wherein the two different wave propagation directions form an angle $\Theta$ with each other, $\Theta$ being equal to $\pm 90°$ or smaller.

4. The resonator device of claim 1, wherein electrodes of the inter-digitated transducer structure of one resonator of the at least two resonators are electrically connected with electrodes of the transducer structure of another resonator of the at least two resonators in a differential manner.

5. The resonator device of claim 1, wherein at least one of the resonators is arranged and positioned such that its wave propagation direction is parallel to a crystalline axis of the piezoelectric substrate.

6. The resonator device of claim 1, wherein at least one of the resonators is arranged and positioned such that its wave propagation direction makes an angle $\Psi$ to one of the crystalline axis of the piezoelectric substrate.

7. The resonator device of claim 6, wherein the angle $\Psi$ is equal to ±45°.

8. The resonator device of claim 1, wherein at least a part of a surface defining the cavity is metalized.

9. The resonator device according to claim 8, wherein the metallization of the cavity comprises at least one grating.

10. The resonator device of claim 1, wherein each one of the reflecting structures of the resonators comprises one or more metallic strips, the metallic strips being connected to each other or connected to ground.

11. The resonator device of claim 1, wherein each resonator of the at least two resonators is a surface acoustic wave resonator, a bulk acoustic wave resonator, a Love wave or a Lamb wave or shear-plate mode acoustic resonator.

12. A differential sensing device comprising at least one resonator device for measuring stress, the differential sensing device comprising:
   at least two resonators, each resonator comprising an inter-digitated transducer structure arranged between two reflecting structures on or in a piezoelectric substrate;
   wherein the at least two resonators are arranged and positioned such that they have two different wave propagation directions;
   wherein each resonator comprises at least two parts with an area between the two parts of the at least two resonators forming a cavity, wherein the cavity is shared by the at least two resonators; and
   wherein each of the at least two parts of the at least two resonators comprises at least one reflecting structure and a part of the inter-digitated transducer structure of the corresponding resonator.

13. The differential sensing device of claim 12, wherein the propagation direction of one of the resonators is parallel or perpendicular to a radial direction to sense a radial force.

14. The differential sensing device of claim 12, wherein the propagation direction of one of the resonators is at an angle with respect to a radial direction to sense a tangential force.

15. The differential sensing device of claim 14, wherein the angle is equal to ±45°.

16. The differential sensing device of claim 12, further comprising an antenna connected to the at least one resonator device.

17. The differential sensing device of claim 12, wherein the at least two resonators are provided on the same piezoelectric substrate.

18. A differential sensing device comprising at least one resonator device according to claim 1, wherein the propagation direction of one of the resonators is parallel or perpendicular to a radial direction to sense a radial force; and wherein the propagation direction of another of the resonators is at an angle with respect to a radial direction to sense a tangential force.

19. The differential sensing device of claim 18, wherein the angle is equal to ±45°.

20. The differential sensing device of claim 18, wherein the at least two resonators are provided on the same piezoelectric substrate.

* * * * *